(12) United States Patent
Okude et al.

(10) Patent No.: US 6,272,848 B1
(45) Date of Patent: Aug. 14, 2001

(54) EXHAUST GAS CLEANING APPARATUS AND METHOD FOR INTERNAL COMBUSTION ENGINE

(75) Inventors: Kojiro Okude, Hitachi; Hidehiro Iizuka, Hitachinaka; Osamu Kuroda, Hitachi; Ryouta Doi, Naka-machi; Toshio Ogawa, Takahagi; Hisao Yamashita, Hitachi; Shigeru Azuhata, Hitachi; Yuichi Kitahara, Hitachinaka; Toshifumi Hiratsuka, Hitachinaka; Norihiro Shinotsuka, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/116,708

(22) Filed: Jul. 17, 1998

(30) Foreign Application Priority Data

Jul. 17, 1997 (JP) .................................................. 9-192158
Sep. 4, 1997 (JP) .................................................. 9-239269

(51) Int. Cl.$^7$ ........................................................ F01N 3/00
(52) U.S. Cl. ........................ 60/274; 60/285; 60/295; 60/30; 60/311; 422/177; 502/328
(58) Field of Search .................... 60/274, 285, 286, 60/295, 301, 311, 645; 422/177; 502/328, 313, 314, 247

(56) References Cited

U.S. PATENT DOCUMENTS

| | | | |
|---|---|---|---|
| 5,116,800 | * | 5/1992 | Williamson et al. ................. 502/303 |
| 5,134,108 | * | 7/1992 | Thakur et al. ........................ 502/318 |

(List continued on next page.)

FOREIGN PATENT DOCUMENTS

| | | |
|---|---|---|
| 195 22 165 | 12/1995 | (DE) . |
| 0 625 633 | 11/1994 | (EP) . |
| 0 814 242 | 12/1997 | (EP) . |
| 8-192051 | 7/1996 | (JP) . |
| 2600492 | 1/1997 | (JP) . |
| 2605553 | 2/1997 | (JP) . |
| 2605559 | 2/1997 | (JP) . |
| 2605571 | 2/1997 | (JP) . |
| 2605580 | 2/1997 | (JP) . |
| 9-155191 | 6/1997 | (JP) . |
| WO 93 08383 | 4/1993 | (WO) . |
| WO 93/08383 | 4/1993 | (WO) . |

OTHER PUBLICATIONS

Patent Abstracts of Japan, Pub. No. 09088560, Pub. Date Mar. 31, 1997.
Patent Abstracts of Japan, vol. 1997, No. 28, Feb. 18, 1997—Publication No. 08 259344 A, Oct. 8, 1996.
Patent Abstracts of Japan, vol. 1995, No. 31, Oct. 1995—Publication No. 07 155601 A, Jun. 1995.

*Primary Examiner*—Jeanette Chapman
*Assistant Examiner*—Sneh Varma
(74) *Attorney, Agent, or Firm*—Evenson, McKeown, Edwards & Lenahan, P.L.L.C.

(57) ABSTRACT

An apparatus and method of highly efficiently purifying nitrogen oxides are provided. An NOx chemisorption reduction catalyst chemically absorbs NOx under a condition that an exhaust gas of an internal combustion engine is an oxidizing atmosphere and deoxidizes adsorbed NOx under a reducing atmosphere. An SOx absorbent absorbs SOx contained in the exhaust gas of the oxidizing atmosphere, and deoxidizes and release SOx absorbed in the reducing atmospheric exhaust gas. The catalyst and absorbent are arranged in the exhaust path to purify the exhaust gas while preventing or suppressing SOx-poisoning of the NOx chemisorption reduction catalyst.

24 Claims, 8 Drawing Sheets

U.S. PATENT DOCUMENTS

| | | | |
|---|---|---|---|
| 5,402,641 | * | 4/1995 | Katoh et al. .......................... 60/285 |
| 5,451,558 | | 9/1995 | Campbell et al. . |
| 5,473,890 | * | 12/1995 | Takeshima et al. ................... 60/285 |
| 5,657,625 | | 8/1997 | Koga et al. . |
| 5,750,082 | * | 5/1998 | Hepburn et al. ..................... 502/328 |
| 5,758,489 | * | 6/1998 | Hepburn et al. ...................... 60/274 |
| 5,771,686 | * | 6/1998 | Pischinger et al. ................... 60/274 |
| 5,849,254 | * | 12/1998 | Suzuki et al. ....................... 502/328 |
| 5,911,961 | * | 6/1999 | Horiuchi et al. ................. 423/213.5 |
| 5,953,907 | * | 9/1999 | Kato et al. ............................ 60/274 |

* cited by examiner

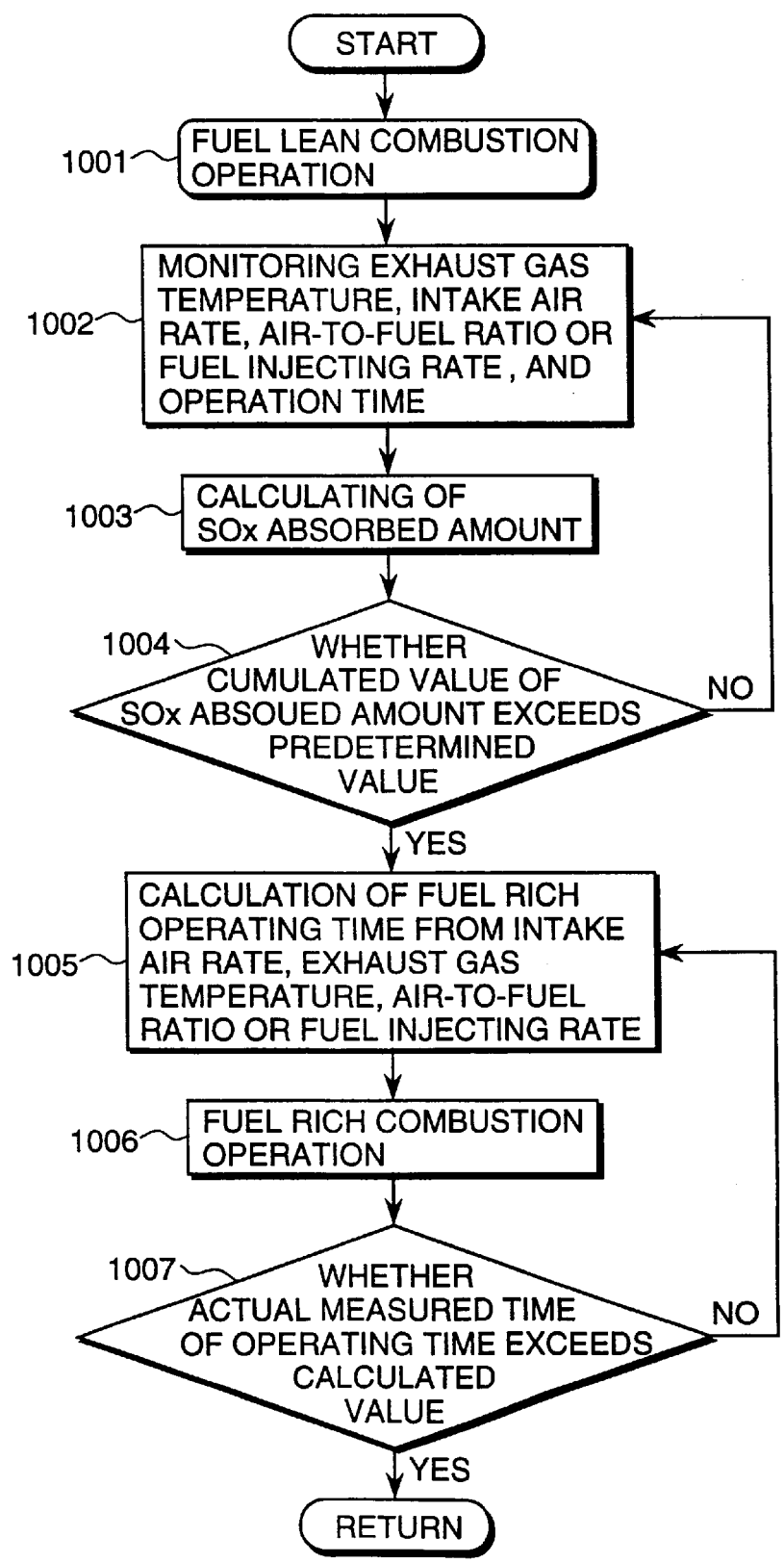

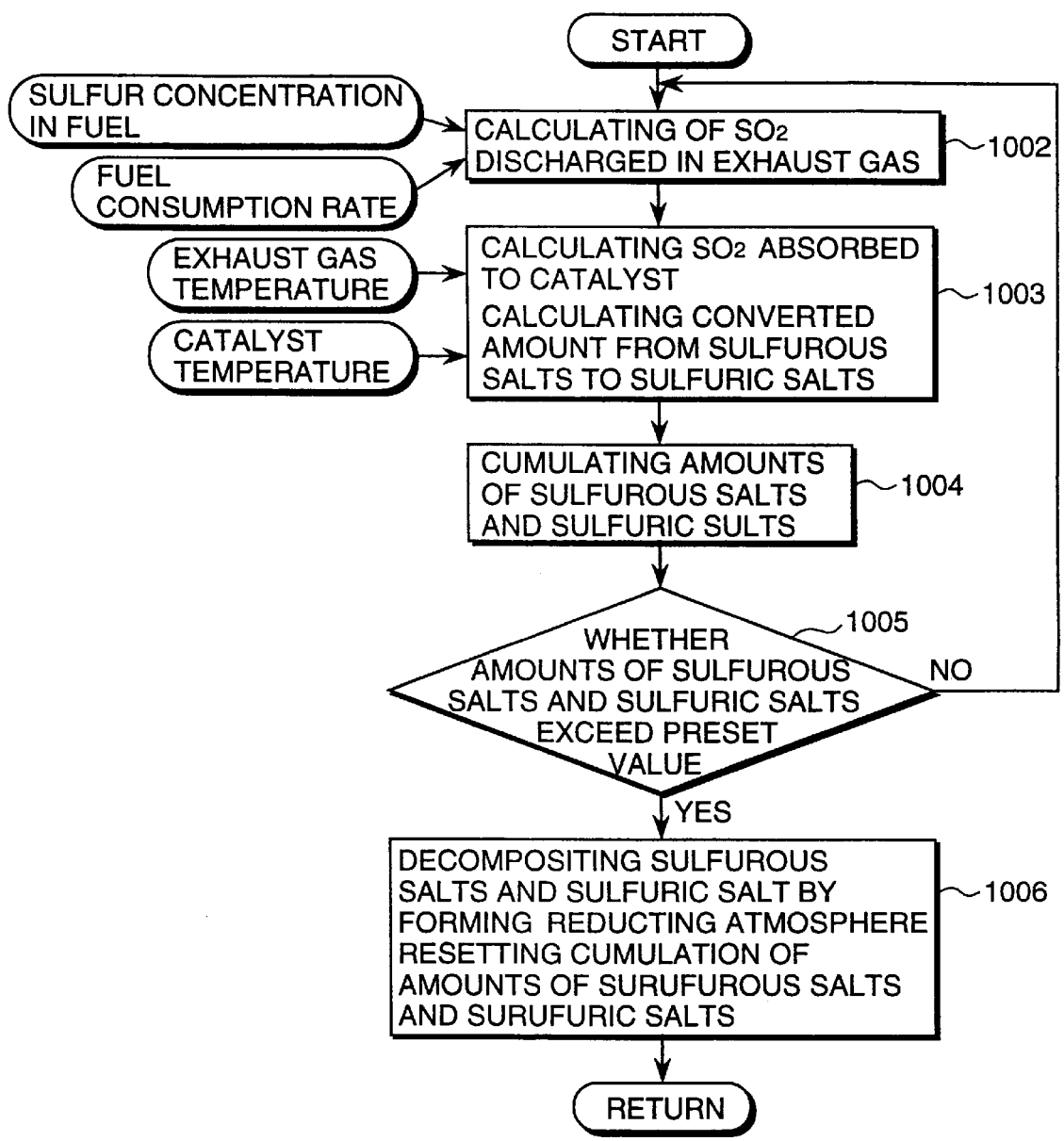

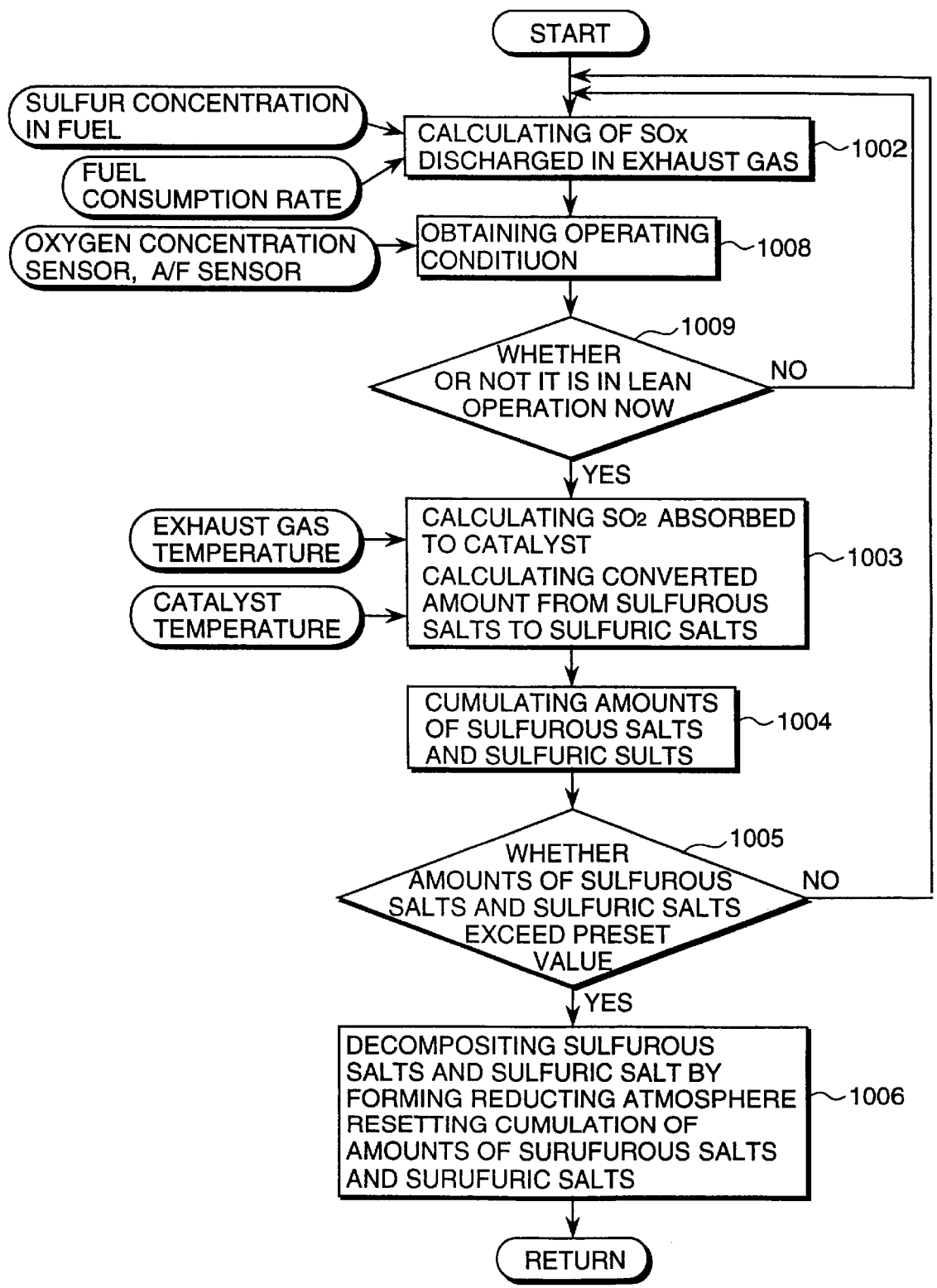

EXHAUST GAS CLEANING APPARATUS AND METHOD FOR INTERNAL COMBUSTION ENGINE

BACKGROUND OF THE INVENTION

The present invention relates to an exhaust gas cleaning or purifying apparatus and method of effectively removing NOx in an exhaust gas while preventing or suppressing poisoning of a NOx reduction catalyst with SOx contained in the exhaust gas of an internal combustion engine such as an automobile engine.

In recent years, a lean-burn engine operated in a fuel-lean condition of an air-to-fuel ratio is regarded as a promising internal combustion engine for a vehicle from the viewpoints of reduction of fuel consuming quantity and prevention of global warming by carbon oxide gas. However, the exhaust gas of the engine becomes an oxidizing atmosphere in which $O_2$ concentration of the exhaust gas exceeds the stoichiometric ratio necessary for complete combustion of reductive components contained in the exhaust gas (hereinafter, such an oxidizing atmosphere is referred to as an oxidizing atmosphere). A conventional three-way catalyst efficiently cleans NOx, HC and CO under a reducing atmosphere in which $O_2$ concentration contained in the exhaust gas is below the stoichiometric ratio necessary for completely burning reductive components contained in the exhaust gas (hereinafter, such reductive atmosphere is referred to as a reductive atmosphere), and does not exhibit sufficient NOx purifying performance under the oxidizing atmosphere. Therefore, it is required to develop a catalyst capable of purifying NOx, HC and CO under a reductive atmosphere, and particularly, effectively purifying NOx.

As the apparatus of purifying an exhaust gas for a lean-burn engine, WO93/07363 and WO93/08383 propose that an NOx absorbent is arranged in an exhaust gas passage. The NOx absorbent absorbs NOx in the exhaust gas during lean fuel combustion and discharge NOx when the oxygen concentration in the exhaust gas decreases.

Since fuel contains a sulfur component, the exhaust gas contains SOx, mainly $SO_2$. The SOx reacts with NOx absorbing components in a NOx absorbent to produce sulfuric salts or sulfurous salts. As a result, there arises the so-called SOx poisoning problem by which the NOx absorbing capability is decreased. Turning the NOx absorbent into sulfuric salt or sulfurous salts becomes intensive in the oxidizing atmosphere of exhaust gas produced by lean combustion. Therefore, improvement of the resistance to SOx poisoning is important to develop a catalyst coping with the lean-burn engine.

JP 2605553 specification discloses an exhaust gas purifying apparatus in which a sulphur capturing apparatus is arranged upstream of a NOx absorbent in an exhaust path of an internal combustion engine. The specification describes that sulphur, as well as NOx, is absorbed in the NOx absorbent, the absorbed sulphur is not released from the NOx absorbent and accumulated gradually in the NOx absorbent even if an air fuel ratio of an exhaust gas flowing in the NOx absorbent is turned to be fuel-rich, and the NOx absorbent comes almost not to absorb NOx as an amount of sulphur within the NOx absorbent increases. The invention of JP 2605553 is to suppress gradual accumulation of sulphur into the NOx absorbent by providing the sulphur capturing apparatus at an upstream side of the NOx absorbent.

JP 2605559 specification, JP 2605571 specification and JP 2605580 specification each disclose that a SOx absorbent is arranged in an exhaust path of an internal combustion engine at an upstream side of a NOx absorbent, which SOx absorbent absorbs SOx when an air fuel ratio of an inflow exhaust gas is in fuel lean side and releases the absorbed SOx when the air fuel ratio of inflow exhaust gas comes to a fuel rich side. Further, the specifications disclose that as the SOx absorbent, an absorbent, which has iron, manganese, nickel, tin, titanium, copper, lithium, etc. each supported on a support comprising alumina, is used, and that it is preferable to support platinum on the support of the SOx absorbent. Further, the JP 2605559 specification discloses an air fuel ratio controlling means provided for controlling an air fuel ratio of an exhaust gas flowed in the SOx absorbent to be rich when SOx is to be released from the SOx absorbent.

Japanese Patent Application Laid-Open No.8-192051 discloses suppressing SOx-poisoning of a NOx absorbent, using a support made of a complex oxide of titanium and zirconium.

Japanese Patent Application Laid-Open No.9-155191 discloses suppressing sulphur poisoning of a NOx absorbent by supporting yttrium and an NOx absorbing component on a support.

The method in which the SOx absorbent is provided upstream of the NOx absorbent is effective when the SOx absorbent has a very high SOx absorption capacity and is able to sufficiently absorb SOx in the exhaust gas. However, when the SOx absorption capacity is low and SOx in the exhaust gas can not be sufficiently absorbed, there is a problem that SOx not absorbed by the SOx absorbent accumulates in the NOx absorbent. Further, there is a problem that the SOx absorption capacity of the SOx absorbent decreases according to passage of time, the SOx not absorbed by the SOx absorbent according thereto is absorbed in the Nox absorbent. According to the disclosure of JP 2605553 specification, SOx absorbed in the NOx absorbent is not released from the NOx absorbent, and the NOx absorption capacity of the NOx absorbent gradually decreases by accumulation of SOx.

SUMMARY OF THE INVENTION

An object of the invention is to provide an exhaust gas purifying apparatus having a SOx absorbent and a NOx reduction catalyst which is able to recover the NOx purifying capacity, even if SOx is absorbed, by releasing the absorbed SOx.

Another object of the invention is to provide an exhaust gas purifying apparatus having a SOx absorbent and a NOx purification catalyst, in which the SOx absorbent has a very high SOx absorption capacity and releases absorbed SOx as $SO_2$, and which is made low in burden to environment contamination.

An exhaust gas purifying apparatus in accordance with the present invention is characterized in that an SOx absorbent and a NOx chemisorption reduction catalyst are arranged in an exhaust path, which SOx absorbent absorbs SOx contained in the exhaust gas under an oxidizing atmosphere and discharges the absorbed SOx under a reducing atmosphere and which NOx chemisorption reduction catalyst chemically adsorbs NOx contained in the exhaust gas under the oxidizing atmosphere and reduces and cleans the adsorbed NOx with a reductive component contained in the exhaust gas.

The SOx absorbent prevents or suppresses the NOx chemisorption reduction catalyst from absorbing SOx by oxidizing at least a part of $SO_2$ in the exhaust gas to absorb in the form of sulfurous salts or sulfuric salts under the oxidizing atmosphere. Further, it is desirable that the SOx absorbent reduces the sulfurous salts or sulfuric salts by the reductive components in the exhaust gas under the reductive atmosphere and discharges in the form of $SO_2$. If the sulfurous salts or sulfuric salts are released in the form of $H_2S$ instead of $SO_2$, environmental contamination is caused because $H_2S$ is poisonous and emit bad smell. Release of them in the form of $SO_2$ is able to have a less influence on the environment. However, SOx is hardly absorbed in the NOx chemisorption reduction catalyst under the reductive atmosphere in which there is little oxygen. Therefore, by periodically switching the state of the exhaust gas between the oxidizing atmosphere and the reductive atmosphere, it is possible that the exhaust gas is cleaned while the NOx chemisorption reduction catalyst is prevented or suppressed from being poisoned with SOx.

The SOx absorbent is composed of an $SO_2$ oxidizing component and an SOx absorbing component. Roles of each component are as follows. The $SO_2$ oxidizing component oxidizes at least part of $SO_2$ in the exhaust gas to $SO_3$ with oxygen, and the SOx absorbing component absorbs the $SO_2$ and $SO_3$ in the forms of sulfurous salts and sulfuric salts. The SOx absorbing component containing the sulfurous salts and the sulfuric salts is deoxidized by the reductive components in the exhaust gas under the reductive atmosphere to discharge $SO_2$.

Temperature of the exhaust gas exhausted from the internal combustion engine of a vehicle is nearly 300 to 600° C. Therefore, a temperature range in which the SOx absorbing component absorbs SOx under the oxidizing atmosphere and deoxidizes and discharges the absorbed SOx is preferably 300 to 600° C.

The inventors studied on materials satisfying the above condition, and found that a noble metal is employed as the $SO_2$ oxidizing component and a metal oxide is employed as the SOx absorbing component, and the metal oxide is an oxide of an element having a thermal decomposition temperature for sulfuric salt of 400 to 800° C. When the thermal decomposition temperature for sulfuric salt is lower than 400° C., an amount of SOx absorbed under the oxidizing atmosphere at 300 to 600° C. is small. When the thermal decomposition temperature for sulfuric salt is higher than 800° C., an amount released from the SOx absorbent by deoxidizing the absorbed SOx under the reductive atmosphere at 300 to 600° C. is small. Accordingly, such an SOx absorbent is not practical.

It is preferable that the SOx absorbing component is an oxide having at least one element selected from the group consisting of Al, Co and Zn.

The SOx absorbent can be prepared by a method in which the SOx absorbing component is used as a support and the $SO_2$ oxidizing component is supported on the SOx absorbing component, and a method in which the SOx absorbing component and the $SO_2$ oxidizing component are supported on a porous support.

Since Al oxide ($Al_2O_3$) has a high specific surface area even at a high temperature, by using the $Al_2O_3$ as a support to support the SOx absorbing component on the $Al_2O_3$ having a high specific surface area, high SOx absorbing or discharging performance can be obtained. Further, since the SOx absorbent which has, as a $SO_2$ oxidizing component, platinum, rhodium, palladium, etc. supported on alumina has a high heat-resistance, the SOx absorbent can be placed near the internal combustion engine where temperature of the exhaust gas in the exhaust passage reaches up to 900° C.

In the case of supporting the SOx absorbing component and the $SO_2$ oxidizing component highly dispersively on the porous support, since Zn absorbs a large amount of SOx under the oxidizing atmosphere at 300 to 600° C. and discharges a large amount of $SO_2$ by deoxidizing the absorbed SOx under the reductive atmosphere at 300 to 600° C., it is preferable that the porous support is made of $Al_2O_3$, and Zn and the $SO_2$ oxidizing component are supported on the porous support.

At least one element selected from the group consisting of Rh, Pt, Pd is employed for the noble metal to be used as the $SO_2$ oxidizing component, whereby oxidization of $SO_2$ can be accelerated under the oxidizing atmosphere.

It is preferable that the supporting amount of Zn is 7 to 40 weight % on the Zn metal basis to $Al_2O_3$ of 100 weight %. When the supporting amount of Zn is less than 7 weight %, Zn supporting effect is insufficient. When the supporting amount of Zn is larger than 40 weight %, the specific surface area of the SOx absorbent decreases to decrease the SOx absorption performance under the oxidizing atmosphere and make the reduction and discharge of the absorbed SOx insufficient.

It is preferable that the supporting amount of the noble metal is 0.5 to 3 weight % on the metallic basis to $Al_2O_3$ of 100 weight %. When the supporting amount of the noble metal is less than 0.5 weight %, it is not practical because the $SO_2$ oxidizing performance of the SOx absorbent decreases. Even if the supporting amount of the noble metal is increased to an amount larger than 3 weight %, the $SO_2$ oxidizing performance is only saturated.

A method of arranging the SOx absorbent and the NOx chemisorption reduction catalyst in the exhaust gas passage will be described below.

(1) A component forming the SOx absorbent and a component forming the NOx chemisorption reduction catalyst are supported on a common support.

(2) The SOx absorbent is coated on the upper layer of the NOx chemisorption reduction catalyst.

(3) In the exhaust gas passage, the SOx absorbent is arranged at a place upstream of the NOx chemisorption reduction catalyst.

In the case of the method (1), the component forming the SOx absorbent and the component forming the NOx chemisorption reduction catalyst are supported on the common support, whereby the absorbing form or the adsorbing form of SOx to the NOx chemisorption reduction component becomes unstable, and accordingly the SOx absorbed in the NOx chemisorption reduction catalyst becomes easy to be discharged to increase the resistance against SOx poisoning.

In the case of the method (2), the SOx absorbent coated on the upper layer of the NOx chemisorption reduction catalyst component has an effect of preventing or suppressing SOx from reaching the NOx purifying catalyst. However, when the coating amount of the SOx absorbent is too much, it is not preferable because NOx is difficult to reach the NOx chemisorption reduction catalyst to decrease the NOx purifying performance.

The coating amount of the SOx absorbent is preferably within the range of 5 to 30 g/L. When the coating amount of the SOx absorbent is smaller than 5 g/L, the NOx chemisorption reduction catalyst is SOx poisoned because the thickness of the coating layer is too thin. When the coating amount of the SOx absorbent is larger than 30 g/L, the NOx purifying performance is decreased.

As a subsidiary effect according to the present invention, when the SOx absorbent containing the noble metal is arranged in the exhaust passage at a place upstream of the NOx chemisorption reduction catalyst, particularly near the engine, the SOx absorbent can have an HC purifying capability in a low temperature such as at a period of starting of the engine. Thereby, it is possible to clean NOx in the exhaust gas and cope with the HC emission restriction including a starting time of the engine while the NOx chemisorption reduction catalyst is prevented or suppressed from being poisoned with SOx.

A mechanism in which SOx-poisoning of the NOx chemisorption reduction catalyst occurs under the oxidizing atmosphere can be roughly expressed as follows.

$$SO_2 + MO \rightarrow MSO_3 \tag{1}$$

$$MSO_3 + \tfrac{1}{2}O_2 \rightarrow MSO_4 \tag{2}$$

$$SO_2 + \tfrac{1}{2}O_2 \rightarrow SO_3 \tag{3}$$

$$SO_3 + MO \rightarrow MSO_4 \tag{4}$$

where the M is an element of the component chemically adsorbing NOx. The SOx in the exhaust gas reacts with the component chemically adsorbing NOx to form a sulfurous salt ($MSO_3$) (reaction formula (1)), and a part of the sulfurous salt ($MSO_3$) is oxidized to form a sulfuric salt ($MSO_4$) (reaction formula (2)). The $SO_2$ is oxidized to form $SO_3$ (reaction formula (3)), and the $SO_3$ reacts with the component chemically adsorbing NOx to form the sulfuric salt ($MSO_4$) (reaction formula (4)).

The NOx absorbent disclosed in the JP 2605553 specification and JP 2605571 specification absorbs NOx in the form of nitrate salts into the bulk of the NOx absorbing component (for example, Ba). This is the same in regard to absorption of SOx, and the NOx absorbing component absorbs SOx in the form of sulfuric salts into the bulk.

On the other hand, the NOx chemisorption reduction catalyst chemically adsorbing NOx in the form of $NO_2$ adsorbs NOx in the form of $NO_2$ near the surface of the NOx adsorbing component. For this reason, the absorption reactions (reaction formulas (1) to (4)) of SOx are also suppressed.

Therefore, the NOx adsorbing component can cause the SOx absorbed by the NOx absorbing component under the reductive atmosphere to be faster decreased under the oxidizing atmosphere.

If the SOx absorbent can not absorb SOx completely under the oxidizing atmosphere, the NOx chemisorption reduction catalyst absorbs the SOx which remains as not absorbed by the SOx absorbent. When the SOx is accumulated in the NOx purification catalyst, the NOx purifying performance is gradually decreases and finally the NOX chemisorption reduction catalyst becomes unable to purify NOx. Therefore, it is preferable that the NOx chemisorption reduction catalyst is as low as possible in SOx absorbing performance and capable of removing the absorbed SOx under the reductive atmosphere.

From the above facts, the catalyst adsorbing NOx in the exhaust gas in the form of $NO_2$ under the oxidizing atmosphere is suitable as the NOx chemisorption reduction catalyst because reaction with SOx is suppressed.

It is preferable that the catalyst adsorbing NOx in the form of $NO_2$ is composed of a porous support of an inorganic oxide, an NOx adsorbing component, a noble metal and a rare earth metal; the NOx adsorbing component comprises Ti and at least one element selected from the group consisting of Li, K, Na, Sr, Mg and Ca; the noble metal comprises at least one element selected from the group consisting of Pd, Rh and Pt; and in particular, the rear earth metal is Ce. The NOx adsorbing component and the rear earth metal are present in the form of oxide. It is desirable that a part or all of the NOx adsorbing component is combined with Ti to be in the form of a complex oxide. It is preferable that the support comprises alumina.

In a case of supporting the component forming the NOx chemisorption reduction catalyst and the component forming the SOx absorbent on the common porous support, it is preferable that the catalyst comprises a porous support, an NOx adsorbing component, a noble metal, a rear earth metal and Zn, the porous supporting body is made of $Al_2O_3$, the NOx adsorbing component comprises a complex oxide of Ti and at least one element selected from the group consisting of Li, K, Na, Sr, Mg and Ca, and the rear earth metal is Ce.

The SOx absorbent and the NOx chemisorption reduction catalyst can be applied in various shapes depending on use. The applicable shapes for the SOx absorbent and the NOx chemisorption reduction catalyst are firstly a honeycomb shape which can be obtained by coating catalyst powder supporting various kinds of components on a honeycomb structure made of various kinds of materials such as cordierite, stainless steel or the like. Further their shape may be a pellet shape, a plate shape, a granular shape, a powder shape, and so on.

The applicable methods for preparing the SOx absorbent and the NOx chemisorption reduction catalyst are preparation physical methods and methods utilizing chemical reaction such as an impregnating method, a kneading method, a co-precipitating method, a sol-gel method, an ion-exchange method, a vapor deposition method, and so on.

The usable starting raw materials of the SOx absorbent and the NOx chemisorption reduction catalyst are various kinds of chemical compounds such as nitric compounds, acetic compounds, complex compounds, hydroxides, carbonic compound and organic compounds, and metals and metal oxides.

As the porous support, alumina is most desirable, but metal oxides and complex metal oxides such as titania, silica, silica-alumina, magnesia, and so on also can be used for the porous support.

The exhaust gas purifying apparatus or the exhaust gas purifying method by the SOx absorbent and NOx chemisorption reduction catalyst arranged in the exhaust path, of the present invention is conducted by alternately repeating a fuel lean combustion operation in which the exhaust gas is an oxidizing atmosphere, and a fuel rich or stoichiometric combustion operation in which the exhaust gas is a reducing atmosphere.

A speed of SOx released from the SOx absorbent is much slower than a speed of NOx released from the NOx chemisorption reduction catalyst. An amount of SOx in the exhaust gas is very smaller than that of NOx. Therefore, in the internal combustion engine provided with the exhaust gas purifying apparatus of the present invention arranged in the exhaust path, it is preferable to repeat, in a usual operation, a fuel lean combustion operation and a fuel rich combustion operation of several to several ten seconds per one operation so as to effect chemisorption of NOx into the NOx chemisorption reduction catalyst and reduction of the adsorbed NOx and to continuously execute a fuel rich combustion operation or stoichiometric combustion operation for one to ten minutes by stopping the fuel lean combustion operation when the SOx absorbing capacity of the SOx absorbent comes to decrease according to passage of time or running distance.

In order to achieve the above-mentioned operations, the exhaust gas purifying apparatus according to the present invention is desirable to provide an operating condition determining means for determining an operating condition of the internal combustion engine and an air-to-fuel ratio control means in addition to the SOx absorbent and NOx chemisorption reduction catalyst. The operating condition determining means of the internal combustion engine comprises a SOx absorbed amount estimation means for estimating an amount of SOx absorbed to the SOx absorbent under the oxidizing atmosphere and judging whether or not a cumulated value of the absorbed amount reaches a predetermined value, and an SOx discharged amount estimating means for estimating an amount of SOx discharged rate from the SOx absorbent under the reductive atmosphere and judging whether or not a cumulated value of the SOx discharged amount reaches a predetermined value. The SOx absorbed amount estimating means estimates an SOx absorbed amount to the SOx absorbent under the oxidizing atmosphere, and the operating condition of the combustion chamber is switched so as to produce the reductive atmosphere using the air-to-fuel ratio control means when it is judged that the cumulated value of the absorbed amount reaches the predetermined value. Successively, when the SOx discharged amount estimating means judges that the SOx discharged amount from the SOx absorbent under the reductive atmosphere reaches the predetermined value, the operating condition of the combustion chamber is switched so as to produce the oxidizing atmosphere using the air-to-fuel ratio control means.

Here, it is difficult to actually measure an amount of SOx absorbed into the SOx absorbed placed in the exhaust gas passage of the internal combustion engine and an amount of SOx discharged from the SOx absorbent. A method of estimating the SOx absorbed amount and the SOx discharged amount will be described below.

It is thought that absorption of SOx to the SOx absorbent under the oxidizing atmosphere is progressed by a process of oxidization of $SO_2$ based on the reaction formula (3) described previously and absorbing of the oxidized $SO_3$ to form sulfuric salts(reaction formula (5)), a process of $SO_2$ being absorbed in the absorbing component to produce sulfurous salts (reaction formula (6)) and a process of the sulfurous salts being oxidized by oxygen to form sulfuric salts (reaction formula (7)).

$$MO + SO_3 \rightarrow MSO_4 \quad (5)$$

$$MO + SO_2 \rightarrow MSO_3 \quad (6)$$

$$MSO_3 + \tfrac{1}{2}O_2 \rightarrow MSO_4 \quad (7)$$

where M indicates an SOx absorbing component of the SOx absorbent, and MO indicates the oxide.

In general, a reaction velocity of chemical reaction is a function of a velocity constant (k) and a molar concentration in connection with the reaction. For example, the reaction velocity equation for the reaction formula (5) can be expressed as follows.

$$d[MSO_4]/d\theta = k[MO][MSO_3] \quad (8)$$

Therein, [ ] indicates the molar concentration (unit: mol/l) of each component, and $d[MSO_4]/d\theta$ indicates a molar concentration of sulfuric salts ($MSO_4$) produced per unit time. Therefore, if the initial values of MO and $MSO_3$ are known, a produced molar concentration $[MSO_4]$ of $MSO_4$ at an accumulating time $\tau$ can be obtained by integrating the reaction velocity equation (8) with time. By multiplying an exhaust gas velocity and an operating time period to the $[MSO_4]$, the produced amount (mol) of $MSO_4$ can be obtained.

Here, the exhaust gas velocity can be estimated by an intake air rate and a fuel injecting rate supplied to the combustion chamber, and an exhaust gas temperature.

Further, since SOx in the exhaust gas is produced from the fuel, the SOx concentration can be estimated based on information on an amount of the fuel injected into the combustion chamber (fuel injecting rate).

Further, an initial concentration of MO is a constant value inherent in the SOx absorbent.

Furthermore, k can be expressed by Arrhenius formula k=A exp (−E/RT), where A is a frequency factor, E is an apparent active energy of the reaction formula (5), R is the gas constant, and T is an exhaust gas temperature. The values A and E can be regarded as constants though they are slightly varied depending on temperature, in the strict sense. Therefore, k is a constant determined on the basis of an exhaust gas temperature T.

From the above, a produced amount of $MSO_4$ can be estimated from a fuel injecting rate, an intake air flow rate, an exhaust gas temperature T and an operating time period at the temperature. Since an air-to-fuel ratio is a value of an intake air flow rate to the combustion chamber divided by a fuel injecting rate, a produced amount of $MSO_4$ can be also estimated from an air-to-fuel ratio, an intake air flow rate, an exhaust gas temperature T and an operating time period t at the temperature. Similarly in regard to the reaction formulas (6) and (7), cumulated values of SOx absorbed amount and SOx discharged amount of the SOx absorbent can be estimated from information of a fuel injecting rate, or an air-to-fuel ratio and an intake air flow rate, and an exhaust gas temperature T, and an operating time period t. Before the cumulated value of SOx absorbed rate estimated in the manner described above exceeds a saturated SOx absorption amount of the SOx absorbent, the operating condition of the internal combustion engine should be switched so that the exhaust gas becomes the reductive atmosphere.

Mechanism of reduction and discharge of SOx absorbed in the SOx absorbent by the exhaust gas of reducing atmosphere is not clear, but can be estimated as follows.

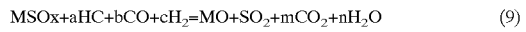

$$MSOx + aHC + bCO + cH_2 = MO + SO_2 + mCO_2 + nH_2O \quad (9)$$

where x is 3 or 4, a to c, m and n are reaction coefficients. In this case, the reaction velocity equation for producing $SO_2$ is as follows.

$$d[SO_2]/dt = k[MSOx][HC]^a[CO]^b[H_2]^c \quad (10)$$

Since HC, CO, $H_2$ in the exhaust gas under the reductive atmosphere are caused by fuel, initial molar concentrations of HC, CO, $H_2$ can be estimated from a fuel injecting rate or an air-to-fuel ratio and an intake air flow rate. Therefore, an SOx discharged amount can be estimated from a fuel injecting rate or an air-to-fuel ratio and an intake air flow rate, and an exhaust gas temperature T, and an operating time period t by the air-to-fuel ratio, similarly in the case of the SOx absorbing reaction. An amount of SOx which should be discharged from the SOx absorbent can be determined from an estimated value of a cumulated value of SOx absorbed amount under the oxidizing atmosphere. Therefore, under the reductive atmosphere, an operating condition can be estimated from the amount of SOx which should be discharged.

In regard to the operating condition estimating method, there is the following method of estimating a time period t for maintaining the exhaust gas temperature T constant on the assumption that the exhaust gas flow rate, the air-to-fuel ratio and the SOx discharged rate from the SOx absorbent are fixed.

The method comprises the steps of providing an exhaust gas velocity estimating means for estimating a flow rate of the exhaust gas discharged from an internal combustion engine, an exhaust gas temperature measuring means for measuring an exhaust gas temperature flowing to the SOx absorbent, a time measuring means for respectively measuring a time period in which the exhaust gas is an oxidizing atmosphere and a time period in which the exhaust gas is a reductive atmosphere, the operating condition determining means and the air-to-fuel ratio control means, the operating condition determining means including the SOx absorbed amount estimating means and the SOx discharged amount estimating means; estimating an SOx absorbed amount under the oxidizing atmosphere by the SOx absorbed amount estimating means using an air-to-fuel ratio or an fuel injection rate, an exhaust gas flow rate obtained from the exhaust gas velocity estimating means, measured results of the exhaust gas temperature measuring means and the time measuring means; and switching an operating condition of an combustion chamber so as to produce a reductive atmosphere exhaust gas by the air-to-fuel ratio control means if the SOx absorbed amount estimating means judges that a cumulative value of the amount of absorbed SOx reaches a predetermined value. Here, a time period required for discharging SOx is estimated by the SOx discharged amount estimating means using the estimated value of the exhaust gas flow rate from the exhaust gas velocity estimating means, the measured value from the exhaust gas temperature measuring means, a predetermined air-to-fuel ratio and a predetermined SOx discharged amount. Then, the air-to-fuel ratio control means controls air-to-fuel ratio to the air-to-fuel ratio value and the time measuring means measures a time period of operating under the air-to-fuel ratio. After that, the air-to-fuel ratio control means switches the operating condition of the combustion chamber so as to produce an oxidizing atmosphere exhaust gas if the SOx discharged amount estimating means judges that the measured value of the time period exceeds the estimated time period.

By this method, it is possible to clean NOx in the exhaust gas while SOx absorption or adsorption by the NOx purifying catalyst is being prevented or suppressed.

The exhaust gas velocity can be estimated from an intake air flow rate to the combustion chamber and the fuel injecting rate, or the air-to-fuel ratio and an exhaust gas temperature. The intake air flow rate can be measured by an air flow sensor. The exhaust gas temperature is a temperature of the exhaust gas flowing into the SOx absorbent, and can be measured by an exhaust gas temperature sensor arranged upstream of the SOx absorbent in the exhaust gas passage. Further, the measured time can be obtained, for example, by a method of counting operating time of the injector, or by a method of counting a timer started at a time when the exhaust gas is switched to the reductive atmosphere or the oxidizing atmosphere.

According to the present invention, it is possible to effectively prevent or suppress the SOx poisoning not depending on type of the internal combustion engine. For example, there are two fuel injection types of internal combustion engine using gasoline, that is, an air intake port inside injection type and a cylinder inside injection type. The present invention can be applied to the both type.

The method of estimating a SOx absorption amount and SOx release amount of the SOx absorbent and controlling a air fuel ratio also is effective as a method of releasing SOx, in order to recover the NOx chemisorption reduction catalyst of which the NOx purifying performance is lowered by absorption or adsorption of SOx. The NOx chemisorption reduction catalyst used in the present invention differs from the NOx absorbent disclosed in the JP2605553 and JP2605571, and can release absorbed or adsorbed SOx from the catalyst by making the air fuel ratio into a fuel-rich ratio or stoichiometric ratio. As a method of recovering the catalyst by effectively releasing SOx from the NOx chemisorption reduction catalyst, the above-mentioned method of estimating a SOx absorption amount and SOx release amount and controlling a air fuel ratio is effective.

Recovery of the NOx chemisorption reduction catalyst also can be carried out by a method of switching an operation to a fuel rich or stoichiometric combustion operation when a running time or distance reaches a certain time or distance, without taking the method of estimating a SOx absorption amount and SOx release amount and controlling a air fuel ratio.

Therefore, according to the present invention, there is provided a method of recovering a NOx chemisorption reduction catalyst which is arranged in an exhaust path of the internal combustion engine and of which the NOx purifying capacity is lowered by absorption or adsorption of SOx in the exhaust gas, wherein an operation is switched to a fuel rich or stoichiometric combustion operation to release SOx even during a fuel lean combustion operation when a running time of distance reaches a constant condition.

Here, the constant condition means a predetermined running time or running distance, and the condition can be determined through some experiments, etc.

Further, according to the present invention, the following catalyst recovery methods (a), (b) and (c) are provided.

(a) A method of recovering a NOx chemisorption reduction catalyst arranged in an exhaust path of an internal combustion engine and detracted from the NOx purifying capacity by adsorption or absorption of SOx in an exhaust gas, wherein the method comprises the steps of:

estimating an amount of sulfur oxides discharged to the exhaust gas from a sulfur concentration contained in a fuel and a consumed amount of the fuel;

estimating an amount of the sulfur oxides absorbed into the catalyst, a produced amount of sulfurous salts and a converted amount from the sulfurous salts to sulfuric salts from an exhaust gas temperature and/or a catalyst temperature; and allowing a rich gas or a stoichiometric gas to flow through the passage to reduce and decompose the sulfurous salts by forming a reductive atmosphere when an amount of the sulfurous salts or the sulfuric salts existing in the catalyst estimated from the cumulative values reaches a predetermined value.

(b) A method of recovering a NOx chemisorption reduction catalyst, arranged in an exhaust path of an internal combustion engine and detracted from the NOx purifying ability by adsorption or absorption of SOx in an exhaust gas, wherein the method comprises the steps of:

estimating an amount of sulfur oxides discharged to the exhaust gas from a sulfur concentration contained in a fuel and a consumed amount of the fuel;

estimating an amount of said sulfur oxides absorbed into said catalyst, a produced amount of sulfurous salts and a converted amount from the sulfurous salts to sulfuric salts from an exhaust gas temperature and/or a catalyst temperature; and allowing a rich gas or a stoichiometric gas to flow through said passage to reduce and decompose the sulfurous salts by forming a reductive atmosphere when an amount of the sulfurous salts or the sulfuric salts existing in the catalyst estimated from the accumulated amounts under an oxygen rich atmosphere reaches a predetermined value.

(c) A method of recovering a NOx chemisorption reduction catalyst arranged in an exhaust path of an internal combustion engine and detracted from the NOx purifying capacity by adsorption or absorption of SOx in an exhaust gas, wherein
the method comprises the steps of:

detecting a concentration of nitrogen oxides in the exhaust gas at the timing when a predetermined time elapses after switching from operating under a reductive atmosphere condition to operation under an oxygen rich condition using a signal from a nitrogen oxide sensor arranged downstream of the exhaust gas purifying catalyst of the exhaust gas passage;

estimating a decreasing ratio of nitrogen oxide purifying rate from the concentration of nitrogen oxides by calculation; and allowing a rich gas or a stoichiometric gas to flow through the passage to reduce and decompose the sulfurous salts by forming a reductive atmosphere when an amount of the sulfurous salts and an amount of the sulfuric salts existing in the catalyst estimated from the decreasing ratio of nitrogen oxide purifying rate reaches a predetermined value.

BRIEF DESCRIPTION OF THE DRAWINGS

FIG. 3 is a flow chart showing an operational aspect of a means for preventing or suppressing SOx-poisoning of an NOx chemisorption reduction catalyst, using a means for estimating an amount of SOx absorbed by the SOx absorbent and a means for estimating an amount of SOx discharged from the SOx absorbent;

FIG. 5 is a flow chart of an operational aspect of a means of detecting a stage before an amount of sulfuric salts converted from sulfurous salts produced in a catalyst by sulfur-poisoning reaches a predetermined value;

FIG. 6 is a flow chart of another operational aspect of the means for detecting;

DESCRIPTION OF THE EMBODIMENTS

Figure 1:
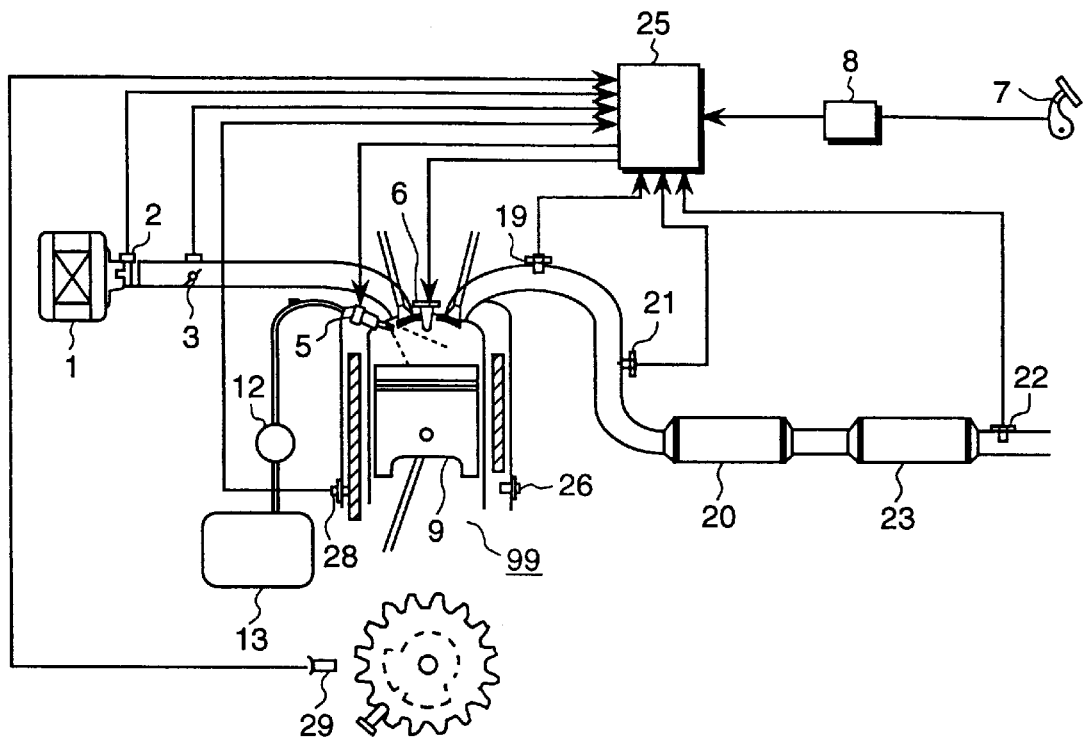
FIG. 1 is a schematic view showing the overall construction of an internal combustion engine provided with an exhaust gas purifying apparatus in accordance with the present invention.

The present invention will be explained below by embodiments, but the present invention is not limited to the embodiments.

EMBODIMENT 1

An alumina coated honeycomb having alumina coating of 150 g per 1 liter apparent volume of honeycomb was obtained by coating a slurry composed of alumina powder and a precursor of alumina adjusted to nitric acidity onto a honeycomb made of cordierite (400 cells/inc$^2$), and then drying and calcining. The alumina coated honeycomb was impregnated with an aqueous solution containing zinc nitrate, and then dried at 200° C. and calcined at 700° C. After that, the Zn supporting honeycomb was impregnated with a dinitro-diamine platinum nitrate solution, dried at 200° C. and then calcined at 700° C. Through the above process, an embodied material 1 containing Zn of 29 g/L and Pt of 2.7 g/L on a metal basis to honeycomb volume of 1 L was obtained. Similarly, embodied materials 2 to 5 supporting Fe, Bi, Co, Cu instead of Zn, an embodied material 6 supporting Pt on an aluminum support, and a comparative material 1 supporting Na on an alumina support were obtained. Further, a comparative material 2 of solely an alumina support was also obtained.

TABLE 1

| SOx absorbent | 1st component | 2nd component |
| --- | --- | --- |
| Embodied material 1 | 29 Zn | 2.7 Pt |
| Embodied material 2 | 25 Fe | 2.7 Pt |
| Embodied material 3 | 135 Bi | 2.7 Pt |
| Embodied material 4 | 27 Co | 2.7 Pt |
| Embodied material 5 | 29 Cu | 2.7 Pt |
| Embodied material 6 | None | 2.7 Pt |
| Comparative material 1 | 29 Na | 2.7 Pt |
| Comparative material 2 | None | None |

EXAMPLE OF TEST 1

(Test method)

Using the embodied materials 1 to 6, an SOx absorbing ratio under an oxidizing atmosphere model gas simulating an exhaust gas burned at an air-to-fuel ratio of 22 to 24, and an SOx discharging ratio under a reductive atmosphere model gas simulating an exhaust gas burned at an air-to-fuel ratio of approximately 14.7 were studied.

The compositions of the oxidizing atmosphere model gas were set to $SO_2$: 150 ppm, NOx: 600 ppm, $C_3H_6$: 500 ppm, CO: 0.1%, $CO_2$: 10%, $O_2$: 5%, $H_2O$: 10%, $N_2$: the remainder.

The compositions of the reductive atmosphere model gas were set to NOx: 1000 ppm, $C_3H_6$: 600 ppm, CO: 0.5%, $CO_2$: 5%, $O_2$: 5%, $H_2$: 0.3%, $H_2O$: 10%, N2: the remainder.

As for test procedure, the SOx absorbing ratio was measured, and then the SOx discharged amount was measured using the same test sample.

The SOx absorbing ratio was obtained by conducting the oxidizing atmosphere model gas at SV 60,000/h through the SOx absorbent layer at 300° C. for 1 hour. The SOx absorbing ratio was defined as a percentage of a total amount [mol] of SOx absorbed in the SOx absorbent to a total amount [mol] of SOx supplied to the SOx absorbent under the reductive atmosphere.

The SOx discharging ratio was obtained by conducting the reductive atmosphere model gas at SV 60,000/h through the SOx absorbent layer at 300° C. for 1 hour. The SOx discharging ratio was defined as a percentage of an amount [mol] of SOx remaining in the SOx absorbent after discharging SOx by the reductive atmosphere to a total amount [mol] of SOx absorbed in the SOx absorbent during the oxidizing atmosphere model gas flowing.

(Test Results)

Table 2 shows the test results. The comparative material 1 supporting Na, of which the sulfuric salt has a thermal decomposition temperature above 800° C., has a low SOx discharging ratio and is not applied as a SOx absorbent. The comparative material 2 not supporting any noble metal hardly absorbs and discharges SOx and does not function a SOx absorbent.

Each of the embodied materials 1, 4 and 6 has a high SOx absorbing ratio and high SOx discharging ratio, and they are suitable as SOx absorbent.

The noble metal accelerates absorption and discharge of SOx. The embodied material 1 supporting Zn and Pt on the alumina support or the embodied material 6 supporting Pt on the alumina support is a particularly excellent SOx absorbent.

Sulfuric salt and sulfurous salt were detected structural measurement of the embodied material after absorbing SOx by Fourier transform infrared (FT-IR) absorption spectrum. Therefore, it can be estimated that SOx absorption of the SOx absorbent is caused by reaction of producing sulfuric salt and sulfurous salt.

TABLE 2

| SOx absorbent | SOx absorbing ratio [%] | SOx discharging ratio [%] |
|---|---|---|
| Embodied material 1 | 81 | 80 |
| Embodied material 2 | 57 | 75 |
| Embodied material 3 | 54 | 33 |
| Embodied material 4 | 74 | 68 |
| Embodied material 5 | 54 | 65 |
| Embodied material 6 | 70 | 70 |
| Comparative material 1 | 69 | 0 |
| Comparative material 2 | 10 | 0 |

Table 3 shows an SOx discharging ratio of the embodied material 1 in a case of excluding HC, CO, $H_2$ in the reductive atmosphere model gas during the SOx discharging ratio measurement. Discharge of SOx is accelerated by containing of HC, CO, $H_2$ in the reductive atmosphere model gas.

TABLE 3

| SOx absorbent | SOx discharging ratio [%] in case of excluding HC, CO, $H_2$ | SOx discharging ratio [%] in case of including HC, CO, $H_2$ |
|---|---|---|
| Embodied material 1 | 5 | 80 |

EXAMPLE OF TEST 2

(Test method)

Using the embodied materials 1 and 6, this test method was similar to the test method of Example of Test 1 except that the SOx discharging temperature at the reductive atmosphere model gas treatment is set to 400° C. or 500° C.

(Test Results)

Table 4 shows the results. The SOx discharging ratios of the embodied material 1 and the embodied material 6 depend on temperature, but SOx is discharged even at 400° C. Further, SOx is easily discharged by containing Zn.

Only $SO_2$ was detected as a result of analysis of the exit gas of the embodied materials 1, 4 and 6. The sum of a discharged amount on the $SO_2$ basis during SOx discharging treatment and an amount of S remaining in the catalyst after the treatment was nearly equal to the SOx absorbed amount before the treatment. Therefore, SOx is discharged into gas phase in the form of $SO_2$.

TABLE 4

| | SOx discharging ratio [%] | |
|---|---|---|
| SOx absorbent | 400° C. | 500° C. |
| Embodied material 1 | 43 | 65 |
| Embodied material 2 | 35 | 52 |

EMBODIMENT 2

In the embodied material 6, Pt of 0 to 4 g on the Pt metal basis per $Al_2O_3$ of 100 g was supported, and evaluation was performed in the same manner as in the test method of Example of Test 1. Table 5 shows the results.

The Sox absorbing ratio is above 60% when the Pt supporting amount is above 0.5 g. The SOx absorbing ratio does not increase even if the noble metal supporting amount is increased above 1.5 g. Taking the material cost elevation into consideration, it is preferable to set the Pt supporting amount to 0.5 to 3 g on the Pt metal basis to $Al_2O_3$ of 100 g.

TABLE 5

| Pt supporting amount [g] to $Al_2O_3$ of 100 g | SOx absorbing ratio [%] | SOx discharging ratio [%] |
|---|---|---|
| 0 | 10 | 0 |
| 0.5 | 60 | 62 |
| 1.5 | 70 | 70 |
| 3.0 | 70 | 70 |
| 4.0 | 70 | 70 |

EMBODIMENT 3

In the embodied material 1, Zn was supported 0 to 50 g on the Zn metal basis to $Al_2O_3$ of 100 g, and evaluation was performed in the same manner as in the test method of Example of Test 1. Table 6 shows the results. In the cases of the Zn supporting amount of 7 to 40 g, the SOx discharging ratio becomes above 75%.

TABLE 6

| Zn supporting amount [g] to $Al_2O_3$ of 100 g | SOx absorbing ratio [%] | SOx discharging ratio [%] |
|---|---|---|
| 0 | 70 | 70 |
| 5 | 75 | 72 |
| 7 | 81 | 75 |
| 20 | 81 | 80 |
| 40 | 76 | 75 |
| 50 | 70 | 65 |

EMBODIMENT 4

An alumina coated honeycomb having coated alumina of 150 g per 1 liter apparent volume of honeycomb was obtained by coating a slurry composed of alumina powder and a precursor of alumina adjusted to nitric acid acidity onto a honeycomb made of cordierite (400 cells/inc$^2$), and then drying and calcining. The alumina coated honeycomb was impregnated with an aqueous solution containing zinc nitrate, and then dried at 200° C. and calcined at 600° C. Further, the alumina coated honeycomb was impregnated with an aqueous solution containing cerium nitrate, and then dried at 200° C. and calcined at 600° C. Furthermore, the alumina coated honeycomb was impregnated with an aqueous solution containing sodium nitrate and strontium nitrate and magnesium nitrate, and then dried at 200° C. and calcined at 600° C. Further, the alumina supporting honeycomb was impregnated with a mixed solution of dinitrodiamine platinum nitrate solution and a rhodium nitrate solution, and then dried at 200° C. and calcined at 450° C. for 1 hour. After that, the alumina supporting honeycomb was impregnated with an aqueous solution containing magnesium nitrate, and then dried at 200° C. and calcined at 450° C. Finally, the alumina supporting honeycomb was calcined at 700° C. for 5 hours, and thus the preparation of catalyst was completed. Through the above process, an embodied catalyst 1 containing Zn of 29 g/L, Ce of 29 g/L, Na of 9 g/L, Sr of 11 g/L, Mg of 0.9 g/L, Pt of 2.7 g/L, Rh of 0.23 g/L and Mg of 2.1 g/L, on a metal basis, per honeycomb volume of 1 L was obtained.

Through the similar method, embodied catalysts 2 and 3, embodied catalysts 4 to 6 not supporting Zn were obtained. Compositions of the prepared catalysts are shown in Table 7. In supporting the active components to each of the catalysts in Table 6, the active components were supported in the following order, that is, the first component, the second component, the third component, and then the fourth component, were supported. A supported amount on the metal basis to honeycomb volume of 1 L is shown at a position before each kind of supported metal.

TABLE 7

| Catalyst | 1st compo. | 2nd compo. | 3rd compo. | 4th compo. | 5th compo. |
| --- | --- | --- | --- | --- | --- |
| Embodied catalyst 1 | 29 Zn | 27 Ce | 9 Na, 11 Sr, 0.9 Mg | 0.23 Rh, 2.7 Pt | 2.1 Mg |
| Embodied catalyst 2 | 29 Zn | 27 Ce | 23 Sr, 8 Ti | 0.23 Rh, 2.7 Pt | 2.1 Mg |
| Embodied catalyst 3 | 29 Zn | 27 Ce | 18 Na, 4 Ti, 1.8 Mg | 0.23 Rh, 2.7 Pt | 2.1 Mg |
| Embodied catalyst 4 | 27 Ce | 9 Na, 11 Sr, 0.9 Mg | 0.23 Rh, 2.7 Pt | 2.1 Mg | None |
| Embodied catalyst 5 | 27 Ce | 23 Sr, 8 Ti | 0.23 Rh, 2.7 Pt | 2.1 Mg | None |
| Embodied catalyst 6 | 27 Ce | 18 Na, 4 Ti, 1.8 Mg | 0.23 Rh, 2.7 Pt | 2.1 Mg | None |

EXAMPLE OF TEST 3

(Test method)

Using the catalysts of Table 7, purifying performance of nitrogen oxides was evaluated by the following method.

The honeycomb catalyst having a volume of 1.7 L was mounted on a vehicle mounting a gasoline engine of lean-burn type having a piston displacement of 1.8 L. Fuel rich combustion operation of 1 minute with an air-to-fuel ratio of approximately 13 and fuel lean combustion operation of 1 minute with an air-to-fuel ratio of approximately 22 were alternately repeated. The reductive atmosphere exhaust gas was obtained during the fuel rich combustion operation, and the oxidizing atmosphere exhaust gas was obtained during the fuel lean combustion operation.

An NOx purifying ratio, HC purifying ratio and CO purifying ratio were obtained by measuring NOx, HC, CO in the exhaust gases before and after the catalyst. NOx was measured by a chemical luminescence method, HC was measured by an FID method, and CO was measured by an infrared absorption method.

(Test results)

Table 8 shows NOx purifying ratios 1 minute after switching to the fuel lean combustion operation. The measured temperature is a temperature of gas just before flowing into the catalyst layer. The embodied catalysts 1 to 3 supporting Zn in accordance with the present invention show NOx purifying ratios higher than the embodied catalysts 4 to 6 not supporting Zn even after thermal history of 700° C. for 5 hours. The NOx purifying ratios during the fuel rich combustion operation are above 90% at 300° C. and 100% at 400° C., and the catalysts have sufficient ternary performance. Even though the fuel rich combustion operation and the fuel lean combustion operation were alternately repeated plural times, the NOx purifying ratio of the catalyst in accordance with the present invention did not vary during the each operation. Further, the HC and CO purifying ratios in the fuel lean combustion operation were above 90%.

TABLE 8

| Catalyst | 300° C. | 400° C. |
| --- | --- | --- |
| Embodied Catalyst 1 | 82 | 79 |
| Embodied Catalyst 2 | 70 | 75 |
| Embodied Catalyst 3 | 79 | 78 |
| Embodied Catalyst 4 | 60 | 58 |
| Embodied Catalyst 5 | 62 | 55 |
| Embodied Catalyst 6 | 62 | 60 |

EXAMPLE OF TEST 4

Similar to Example of Test 2, after flowing the oxidizing atmosphere model gas containing SOx, NOx purifying ratios were measured by the method described in the test method of Example of Test 3. The results are shown in Table 9. The embodied catalysts 1 to 3 containing Zn have excellent SOx resistance.

TABLE 9

| Catalyst | Temp. NOx purifying ratio [%] | |
| --- | --- | --- |
| | 300° C. | 400° C. |
| Embodied Catalyst 1 | 60 | 40 |
| Embodied Catalyst 2 | 50 | 30 |
| Embodied Catalyst 3 | 58 | 40 |
| Embodied Catalyst 4 | 38 | 28 |
| Embodied Catalyst 5 | 40 | 25 |
| Embodied Catalyst 6 | 38 | 30 |

EXAMPLE OF TEST 5

The reductive atmosphere exhaust gas was conducted through the embodied catalysts 1 to 6 poisoned with SOx in the same method of Example of Test 3. The reductive atmosphere exhaust gas used was a combustion exhaust gas during operation at an air-to-fuel ratio of 14.7 near the stoichiometric air-to-fuel ratio, the exhaust gas temperature was set to 500° C. or 600° C., and the exhaust gas flowing period to the embodied catalyst was set to 10 minutes. After flowing the reductive atmosphere exhaust gas, NOx purifying ratio was measured by the method described in the test method of Example of Test 1. Table 10 shows the results in the oxidizing atmosphere at 300° C. It is clear that recovering of NOx purifying performance is accelerated by containing Zn. This is considered to be a multiplier effect of the NOx purifying component and Zn.

TABLE 10

| Catalyst | Reducing temp. NOx purifying ratio [%] | |
| --- | --- | --- |
| | 500° C. | 600° C. |
| Embodied Catalyst 1 | 65 | 82 |
| Embodied Catalyst 2 | 56 | 70 |
| Embodied Catalyst 3 | 65 | 79 |
| Embodied Catalyst 4 | 38 | 55 |
| Embodied Catalyst 5 | 40 | 50 |
| Embodied Catalyst 6 | 38 | 40 |

EMBODIMENT 5

Alumina powder was impregnated with an aqueous solution containing zinc nitrate, and then dried at 200° C. and calcined at 600° C. After that, the alumina powder was impregnated with a dinitro-diamine platinum nitrate solution, dried at 200° C. and then calcined at 600° C. Thus, powder of SOx absorbent was obtained. The powder of SOx absorbent was dispersed in a basic silica sol, and the embodied catalyst 4 was coated with the basic silica sol to obtain an SOx absorbent coated catalyst. The calcining temperature at coating was set to 700° C. Then, NOx purifying ratio after flowing of the reductive atmosphere exhaust gas was measured by the method similar to in Example of Test 5. Table 11 shows the results at 400° C. The embodied catalyst 4 can be suppressed to be poisoned by SOx by coating the SOx absorbent above 5 g/L. However, when the coating amount exceeds 30 g/L, NOx is suppressed to diffuse into the NOx purifying catalyst to decrease the purifying ratio.

TABLE 11

| Coating amount of SOx absorbent [g/L] | NOx purifying rate (%) | |
| --- | --- | --- |
| | Initial | After SOx treatment |
| 0 | 60 | 30 |
| 2 | 62 | 30 |
| 5 | 67 | 45 |
| 20 | 67 | 51 |
| 30 | 62 | 51 |
| 35 | 38 | 36 |
| 50 | 37 | 35 |

EMBODIMENT 6

The embodied catalyst 4 having a volume of 0.6 L was arranged in series in an exhaust gas passage under the floor of a vehicle mounting a gasoline engine of lean-burn type having a piston displacement of 1.8 L. In addition to this, two of the embodied catalysts 4 having a volume of 0.6 L were arranged in series, for purpose of a comparative test.

In regard to operating control, fuel rich combustion operation of 1 minute with an air-to-fuel ratio of 13 and fuel lean combustion operation of 1 minute with an air-to-fuel ratio of 22 were alternatively repeated. The NOx purifying ratio after 5 hour operation at an exhaust gas temperature of 300° C. was measured. The regular gasoline of the domestic specification of Japan contains only 50 ppm of sulfur composition in the fuel. Therefore, in order to shorten the time period of the SOx poisoning endurance test, a gasoline for endurance test was made by adding 1600 ppm of thiophene to the regular gasoline. By using the gasoline for endurance test, the test time can be accelerated approximately 32 times as fast as the regular gasoline test time.

Table 12 shows the test results. The NOx purifying ratio is a value 1 minute after switching to the fuel lean combustion operation. By using the embodied material 1, decrease in NOx purifying ratio by SOx can be substantially improved.

TABLE 12

| Arrangement of SOx absorbent and NOx chemisorption reduction catalyst | NOx purifying rate (%) | |
| --- | --- | --- |
| | Initial | After 5 hour operation |
| Embodied catalyst 4 is arranged downstream of Embodied material 1 | 90 | 80 |
| Two Embodied catalysts 4 are arranged in series | 90 | 60 |

EMBODIMENT 7

FIG. 1 is a view showing the overall construction of an embodiment of an internal combustion engine including an exhaust gas purifying apparatus in accordance with the present invention.

The internal combustion engine in this embodiment is a system mounting an engine 99 of an in-cylinder injection type (or gasoline direct injection type) capable of operation in an oxidizing atmosphere, and comprises an intake air system having an air flow sensor 2, a throttle valve 3 and so on, an exhaust gas system having an oxygen concentration sensor (or an air-to-fuel sensor) 19, an exhaust gas temperature sensor 21, an SOx absorbent 20 and an NOx chemisorption reduction catalyst 23 in accordance with the present invention, a catalyst outlet gas temperature sensor 22 and so on, and a control unit (ECU) 25 and so on. The ECU 25 is composed of an I/O LSI as an interface, a microprocessor MPU, memory units ROM and RAM storing a group of control programs, a timer counter and so on. Detected signals from a load sensor 8 for detecting an amount of stepping on an accelerator pedal 7, a crank angle sensor 29, the air flow sensor, a water temperature sensor 28, the oxygen concentration sensor (or the air-to-fuel sensor) 19, the exhaust gas temperature sensor 21, the catalyst outlet gas temperature sensor 22 and the like are input to the ECU 25 through an input interface.

The internal combustion engine described above operates as follows.

The engine is operated by forming a mixed gas of intake air and fuel by the in-cylinder injection engine 99, gathering the mixed gas around a spark plug 6, and burning the mixed gas just before the time when the piston 9 reaches the top dead point. Here, the intake air to the in-cylinder injection engine 99 is filtered by an air cleaner 1, measured by the air flow sensor 2 and supplied to the combustion chamber of the in-cylinder injection engine 99 through the throttle valve 3. On the other hand, fuel is supplied from a fuel tank 13 through a fuel pump 12, and injected in the combustion chamber through an injector 5 with a high pressure.

The ECU 25 determines an operating condition such as an air-to-fuel ratio and so on by evaluating the operating condition of the internal combustion engine and the conditions of the SOx absorbent 20 and the NOx chemisorption reduction catalyst 23 in accordance with the present invention based on each of the sensor signals and the group of pre-stored control programs, and controls the injector 5 and the spark plug 6 and so on to burn the mixed gas under an appropriate condition.

During the fuel lean combustion operation, the ECU 25 controls the air-to-fuel ratio to a fuel lean limit value in order to attain the most economical fuel consumption rate. However, when the air-to-fuel ratio exceeds the fuel lean limit value, the combustion condition of the engine 99 is deteriorated to cause an abnormality such as misfiring and to increase fluctuation of generating torque due to decrease in combustion pressure. The torque fluctuation causes fluctuation in rotating speed of the engine. Therefore, by predetermining a limit value of the fluctuation in rotating speed, the ECU 25 can control the air-to-fuel ratio or the fuel injection rate so that the rotating speed of the engine obtained from the crank angle sensor 29 is always equal to the limit value. By doing so, the air-to-fuel ratio can be always controlled to the fuel lean limit value without deteriorating the combustion condition of the engine.

Then, the burned exhaust gas is introduced into the exhaust gas system. The NOx chemisorption reduction catalyst 23 is arranged downstream of the SOx absorbent 20 in the exhaust gas system. When the internal combustion engine is in the fuel lean combustion operation, SOx in the oxidizing atmosphere exhaust gas is absorbed in the SOx absorbent 20 and NOx is adsorbed in the NOx chemisorption reduction catalyst 23. In the fuel lean combustion operation, before the time when the SOx absorbed amount of the SOx absorbent 20 or the NOx adsorbed amount of the NOx chemisorption reduction catalyst 23 reaches saturation, the air-to-fuel ratio is shifted to the fuel rich condition to perform discharging of the absorbed SOx in the SOx absorbent 20 by reduction or purifying of the NOx adsorbed and held during the fuel lean combustion operation. Further, during the fuel rich operation, NOx, HC, CO in the exhaust gas are also cleaned by the three-way catalyst function.

By the above-mentioned operation, the NOx in the exhaust gas can be effectively cleaned while the NOx chemisorption reduction catalyst 23 is being prevented from being SOx poisoned under all the combustion conditions of the engine.

Figure 2:
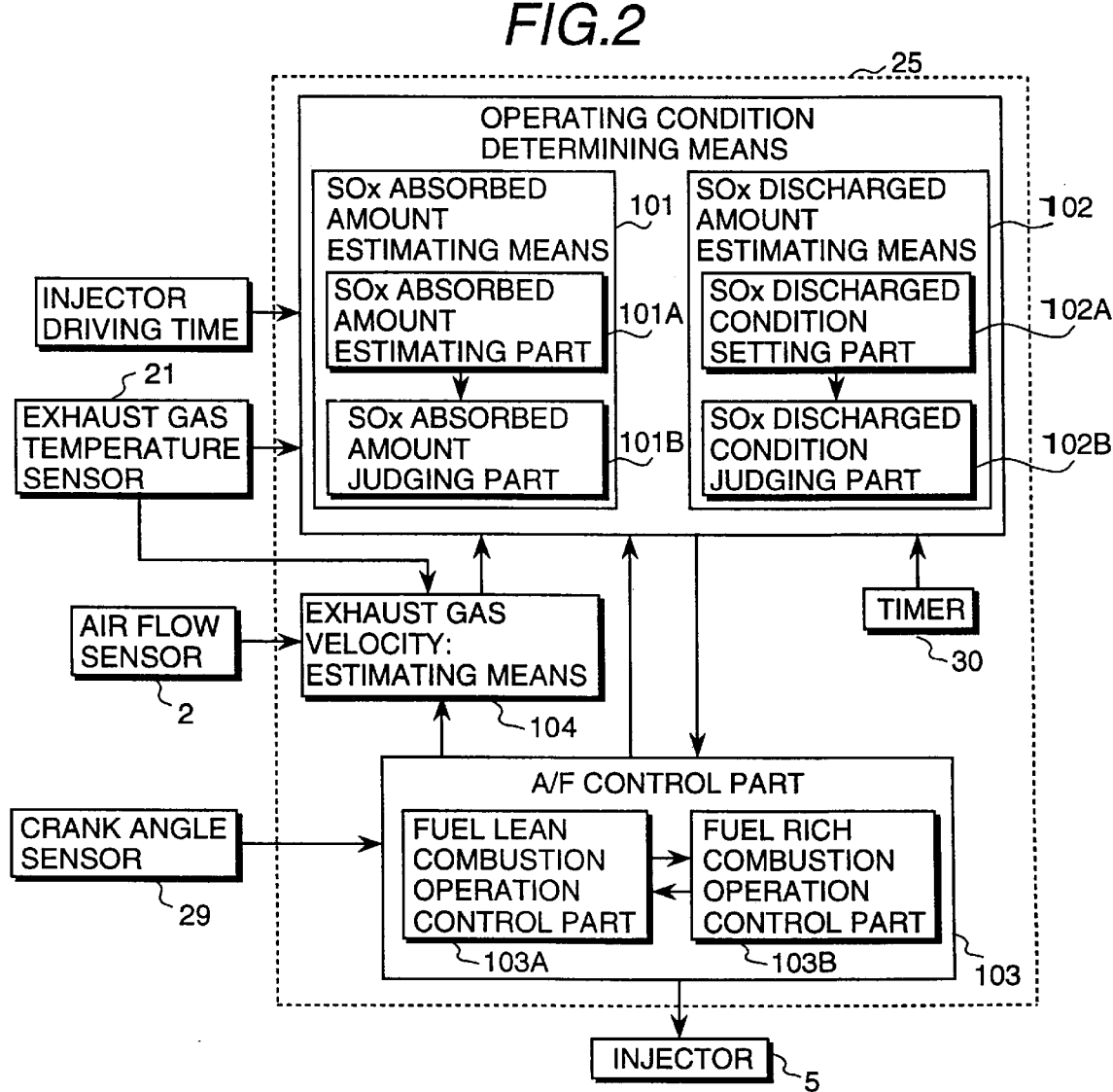
FIG. 2 is a control block diagram schematically showing the element construction of a control system in accordance with the present invention.
Figure 4A:
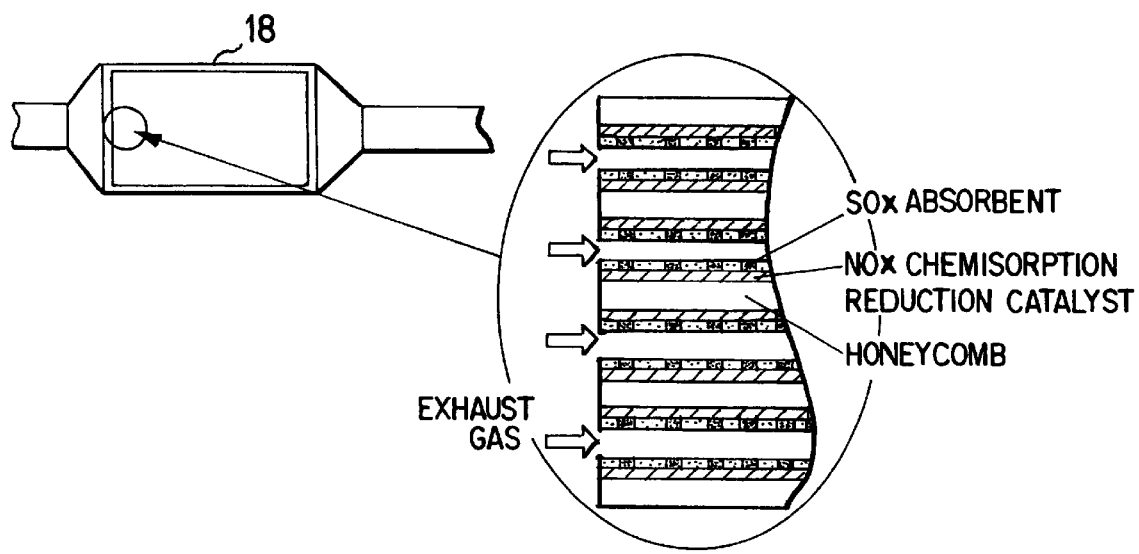
FIG. 4a is an isolated view of the container shown in FIG. 4 but with an exploded view of a portion of the catalyst showing that the SOx absorbent and NOx chemisorption reduction catalyst are layered, not mixed.
Figure 4B:
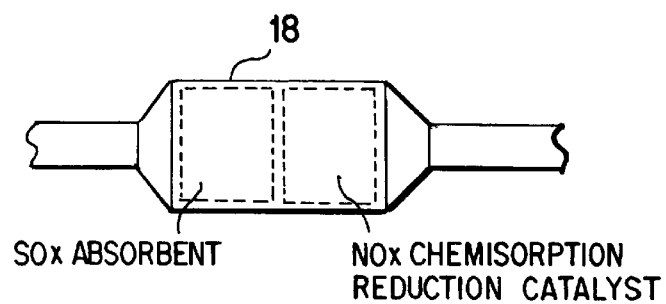
FIG. 4b is a view similar to FIG. 4a but showing an embodiment in which the absorbent and catalyst are mounted separately in the container.

Here, description will be made on part in connection with the SOx absorbent among the functions of the ECU 25. As shown in FIG. 2, the ECU 25 comprises an SOx absorbed amount estimating means 101 and an SOx discharged amount estimating means 102 and an air-to-fuel ratio control means 103 and an exhaust gas velocity estimating means 104. The SOx absorbed amount estimating means 101 comprises a function for estimating an amount of SOx absorbed in the SOx absorbent (an SOx absorbed amount estimating part) 101A and a function for judging from the estimated value that the cumulated value of the SOx absorbed amount reaches a preset value (an SOx absorbed amount judging part) 101B. The SOx discharged amount estimating means 102 comprises (a discharging condition setting part) 102A for estimating a time period required for discharging SOx from the SOx absorbent and operating condition such as an air-to-fuel ratio, and (an SOx discharging condition judging part) 102B for judging that the operating condition reaches an estimated value. The air-to-fuel control means 103 comprises a fuel lean combustion operation control part 103A and a fuel rich combustion operation control part 103B.

That is, when the amount of SOx absorbed in the SOx absorbent 20 reaches saturation, the SOx poisoning of the NOx chemisorption reduction catalyst 23 occurs. Therefore, when the SOx absorbed amount estimating part 101A estimates an amount of SOx absorbed in the SOx absorbent and the SOx absorbed amount judging part 101B judges that the cumulated value of the SOx absorbed amount reaches a preset value, the fuel rich combustion operation control part 103B of the air-to-fuel control means 103 starts fuel injection amount control of the injector 5 by setting the air-to-fuel ratio so as to produce the reductive atmosphere exhaust gas. At that time, the discharging condition setting part 102A of the SOx discharged amount estimating means 102 estimates control values (a time period, as an air-to-fuel ratio and the like) required for discharging SOx from the SOx absorbent 20, and the fuel rich combustion operation control part 103B controls based on the estimated values. The SOx discharging condition judging part 102B monitors the information of the fuel rich combustion operation control part 103B, and when the SOx discharging condition judging part 102B judges the control value reaches the estimated value, the fuel lean combustion operation control part 103A of the air-to-fuel control means 103 starts fuel injection amount control of the injector 5 by setting the air-to-fuel ratio so as to produce the reductive atmosphere exhaust gas.

The amount of SOx absorbed to the SOx absorbent under the oxidizing atmosphere and the amount of SOx discharged from the SOx absorbent can be estimated from an gas flow velocity and a fuel consumption rate and an exhaust gas temperature and an operating time period. The gas flow velocity can be estimated by the exhaust gas velocity estimating means 104 from an intake air amount and a fuel injection rate and an exhaust gas temperature. The information on the fuel consumption rate can be obtained from the air-to-fuel ratio control means 103. The exhaust gas temperature can be obtained from the exhaust gas temperature sensor 21, and the intake air amount can be obtained from the air flow sensor 2. The operating time period can be measured by a driving time of the injector or by operating a timer 30 during the fuel lean combustion operation.

FIG. 3 is a flow chart showing an embodiment in accordance with the present invention. Initially, when the fuel lean combustion operation (step 1001) is started, based on information of an intake air rate, an exhaust gas temperature, an air-to-fuel ratio or a fuel consumption rate, and an operating time (step 1002), an Sox absorbed amount is calculated by the SOx absorbed amount estimating part 101A (step 1003). Next, the processing proceeds to step 1004, the SOx absorbed amount judging part 101 judges whether or not the cumulated value of the SOx absorbed amount reaches a predetermined value. If it is judged that the cumulated value of the SOx absorbed amount exceeds the predetermined value, the air-to-fuel ratio control means 103 starts control of the fuel rich combustion operation. A fuel rich combustion operating time is calculated by the SOx discharging condition judging part 102B based on the exhaust gas temperature and the intake air rate (step 1005). In this calculation, an air-to-fuel ratio during the fuel rich combustion operation is necessary, but here, the air-to-fuel ratio can be fixed to, for example, approximately 13. Then, the air-to-fuel ratio control means 103 starts the fuel rich combustion operation (step 1006). In step 1007, the operating time is monitored, and when the Sox discharging condition judging part 102B judges that the measured value exceeds the calculated value, the processing returns to step 1001 to start the fuel lean combustion operation.

By this method, the NOx chemisorption reduction catalyst 23 can be prevented or suppress to be poisoned with SOx.

EMBODIMENT 8

Figure 4:
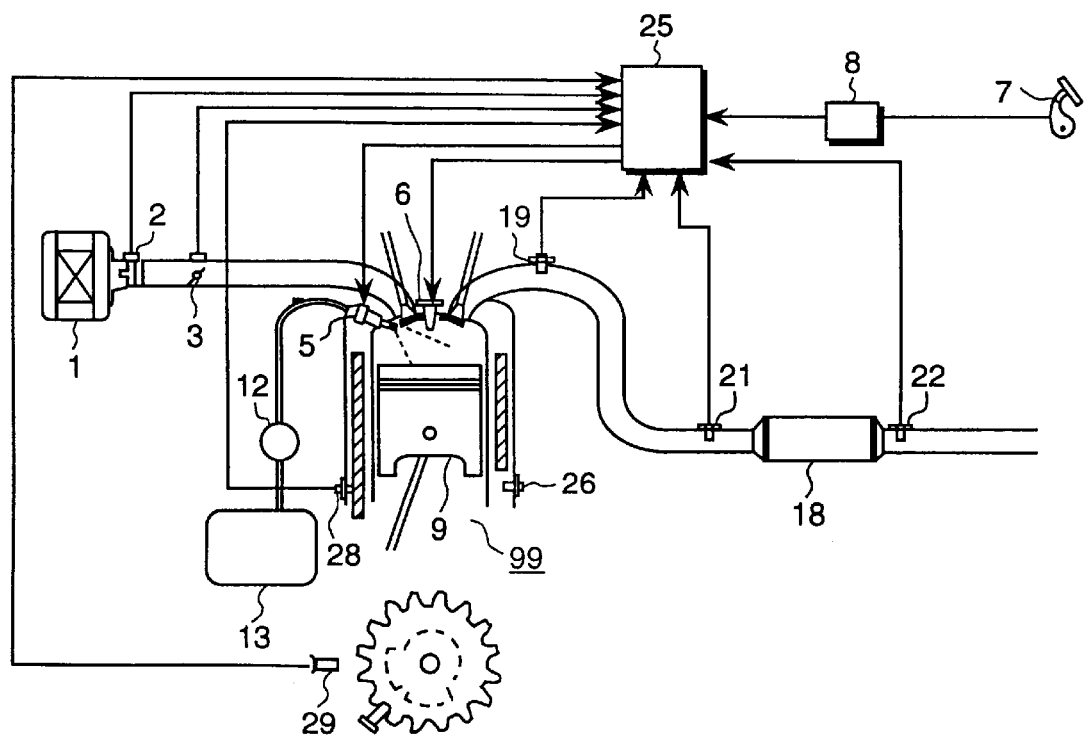
FIG. 4 is a schematic view showing the overall construction of an internal combustion engine suitable in a case where the SOx absorbent component and the NOx chemisorption reduction catalyst component are supported in a common support or in a case where the SOx absorbent is coated on the upper layer of the NOx chemisorption reduction catalyst.

FIG. 4 is an example of a construction of mounting an NOx chemisorption reduction catalyst (18) in a case where the SOx absorbent component and the NOx chemisorption reduction catalyst component are supported in the same support or in a case where the SOx absorbent is coated on the upper layer of the NOx chemisorption reduction catalyst. In this embodiment, the SOx absorbent and the NOx chemisorption reduction catalyst can be compactly arranged in the exhaust gas passage.

EMBODIMENT 9

Next, an embodiment of a method of recovering the NOx chemisorption reduction catalyst lowered in NOx purifying performance by adsorption or absorption of SOx will be explained hereunder.

FIG. 5 is a flow chart showing an embodiment of a means for detecting a stage before the time when sulfurous salts are produced in a catalyst by sulfur poisoning and an amount of sulfuric salts converted from the sulfurous salts reaches a predetermined value.

In step 1002, an amount of $SO_2$ discharged in the exhaust gas is estimated by calculation from a sulfur concentration in the fuel and a consumption rate of the fuel. In step 1003, an amount of $SO_2$ absorbed in the catalyst out of the amount of the discharged $SO_2$ estimated in step 1002 is estimated by reading the signals such as an exhaust gas temperature and the like, and an amount of sulfurous salts newly produced on the catalyst is estimated. In addition to these, in step 1003, an amount of sulfuric salts which are to be converted from the sulfurous salt accumulated on the catalyst by heating is estimated. This is because both of the $SO_2$ absorption rate to the catalyst and the conversion rate from the sulfurous salts to the sulfuric salts are varied depending on temperature. The amounts of sulfurous salts and sulfuric salts estimated in step 1004 are respectively cumulated. In step 1005, it is judged whether or not the cumulated amount of sulfurous salts or sulfuric salts exceeds a predetermined value. If the cumulated amount does not exceed the predetermined value, the processing is repeated from step 1002. If the cumulated amount exceeds the predetermined value, in step 1006 a reductive atmosphere is formed to reduce and decompose the sulfur oxides, and the cumulate of the sulfurous salts and the sulfuric salts are reset.

FIG. 6 is a flow chart showing another embodiment of a means for detecting a stage before the time when sulfurous salts are produced in a catalyst by sulfur poisoning and an amount of sulfuric salts converted from the sulfurous salts reaches a predetermined value.

Different points from FIG. 5 are as follows. In step 1008, an operating condition of the engine is obtained from signals of an oxygen concentration, an A/F and others. In step 1009, it is judged whether the operating condition of the engine now is lean, stoichiometric or rich operation. If it is lean operation, the processing proceeds to step 1003 to cumulate amounts of sulfurous salts and sulfuric salts. If it is stoichiometric or rich operation, the processing skips the steps below step 1003 to return to step 1002. This is because since the sulfur poisoning particularly strongly occurs during lean operation, accuracy of cumulating amounts of the sulfurous salts and the sulfuric salts is higher in a case of cumulating only during lean operation than in a case of cumulating over the whole operating period.

Figure 7:
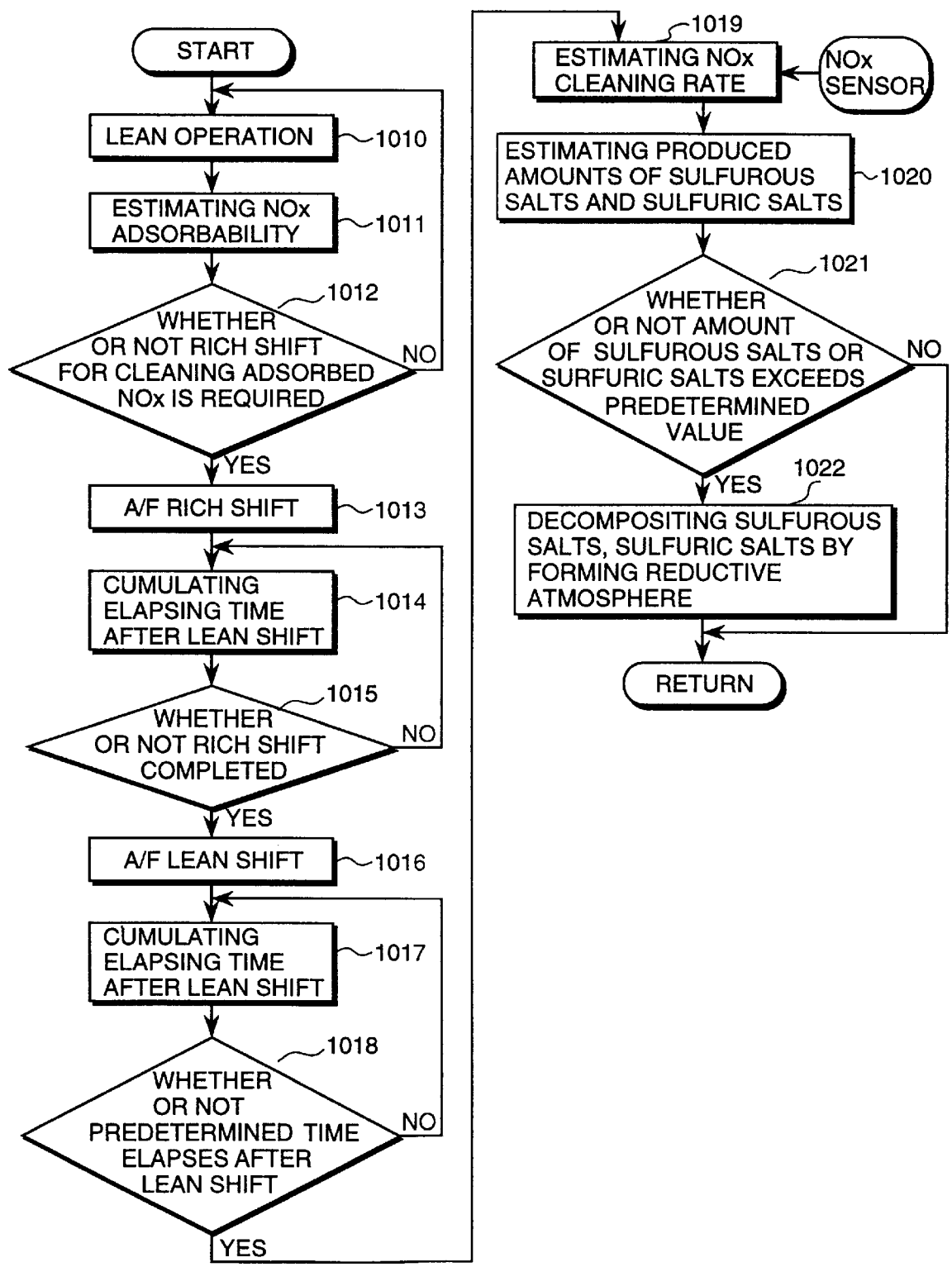
FIG. 7 is a flow chart of an operational aspect of a means of detecting a stage before an amount of sulfuric salts converted from sulfurous salts produced in a catalyst by sulfur-poisoning reaches a predetermined value.

FIG. 7 is a flow chart showing another embodiment of a means for detecting a stage before the time when sulfurous salts are produced in a catalyst by sulfur poisoning and an amount of sulfuric salts converted from the sulfurous salts reaches a predetermined value.

Lean operation is performed in step 1010. In step 1011, an NOx adsorbing capability of the catalyst is estimated. In step 1012, it is judged from the NOx adsorbing capability whether or not adsorbed NOx needs to be cleaned by shifting the A/F to a rich condition. The A/F is shifted to a rich condition in step 1013, and an elapsing time after the rich shifting is cumulated in step 1014, and completion of the rich shifting is judged in step 1015. Then, the A/F is lean shifted in step 1016, and an elapsing time after the lean shifting is cumulated in step 1017. In step 1018, it is judged whether a predetermined time after the lean shifting elapses or not. If the predetermined time has elapsed, an NOx purifying rate is estimated using signal from the NOx sensor arranged downstream of the catalyst and so on in step 1019. In step 1020, amounts of sulfurous salts and sulfuric salts produced in the catalyst are estimated from the NOx purifying rate estimated. In step 1021, it is judged whether or not the estimated amount of sulfurous salts or sulfuric salts reaches a predetermined value. If the estimated amount of sulfurous salts or sulfuric salts exceeds the predetermined value, the sulfur oxides are reduced and decomposed by forming a reductive atmosphere in step 1022.

Figure 8:
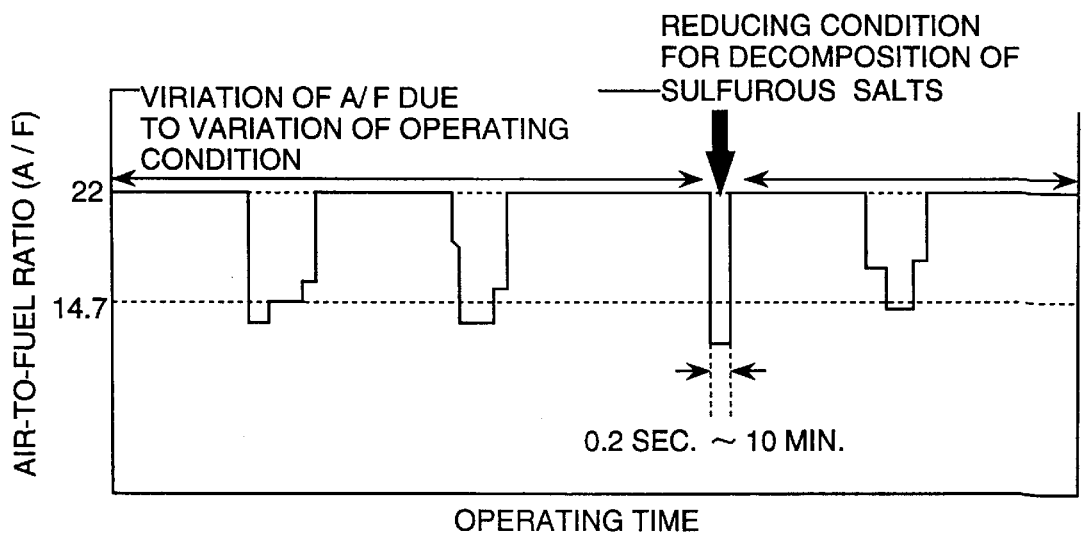
FIG. 8 is a diagram showing an example of variations of air fuel ratio in an operation, using a catalyst recovering method according to the present invention.

FIG. 8 shows an example of change of air-to-fuel ratio in operation using a method of recovering a catalyst according to the present invention.

The sulfurous salts and the sulfuric salts produced in the catalyst by being poisoned by sulfur oxide can be reduced and decomposed with a reductive atmosphere, but this reaction is more difficult to occur compared to the reaction to reducing and purifying NOx adsorbed to an NOx chemisorption reduction catalyst. Therefore, the rich shifting for reducing and decomposing the sulfurous salts and the sulfuric salts needs to be performed for a time period equal to or longer than at least a time period required for the rich shifting for reducing and purifying the NOx adsorbed to the NOx chemisorption reduction catalyst. However, since the fuel economy becomes degraded by performing the rich shifting, the rich shifting should not be kept for a time longer than necessary. As shown in FIG. 8, the rich shifting time is preferably longer than 0.2 second and shorter than 10 minutes.

According to the present invention, an SOx absorbent and an NOx chemisorption reduction catalyst are arranged in an exhaust path of an internal combustion engine, whereby a decrease in NOx purifying capacity of the NOx chemisorption reduction catalyst by absorption or adsorption of SOx can be suppressed. Further, since the NOx chemisorption reduction catalyst can release SOx by effecting a fuel rich combustion operation or stoichiometric combustion operation even if SOx is absorbed or adsorbed, the NOx purifying capacity can be recovered by estimating an absorption amount or adsorption amount of SOx in the NOx chemisorption reduction catalyst, and operating so as to release SOx when approached to a saturated condition.

What is claimed is:

1. An exhaust gas purifying apparatus for an internal combustion engine, having a SOx absorbent and a NOx purifying catalyst each arranged in an exhaust path of the internal combustion engine in which lean burn is effected, said SOx absorbent absorbing SOx in an inflow exhaust gas under an oxidizing atmosphere in which the $O_2$ concentration of said exhaust gas is higher than a stoichiometric ratio required for completely burning a reductive component contained in said exhaust gas, and releasing the absorbed SOx under a reducing atmosphere in which the $O_s$ concentration of an exhaust gas is lower than a stoichiometric ratio required for completely burning a reductive component contained in said exhaust gas, said NOx purifying catalyst capturing NOx in said exhaust gas under the oxidizing atmosphere in which the $O_2$ concentration of said exhaust gas is higher than a stoichiometric ratio required for completely burning a purifying component contained in said exhaust gas, wherein as said NOx purifying catalyst, there is provided a NOx chemisorption reduction catalyst chemically capturing NOx as $NO_2$ on a surface of said NOx purifying catalyst under said oxidizing atmosphere and reducing the chemically captured $NO_2$ with said reductive component to $N_2$ to release the $N_2$ from the surface of said NOx purifying catalyst under said reducing atmosphere.

2. An exhaust gas purifying apparatus for an internal combustion engine according to claim 1, wherein as said SOx absorbent, there is provided a SOx absorbent reducing the SOx absorbed under said oxidizing atmosphere to $SO_2$ to release it under said reducing atmosphere.

3. An exhaust gas purifying apparatus for an internal combustion engine according to claim 1, wherein said SOx absorbent is arranged in said exhaust path at an upstream side of said NOx chemisorption reduction catalyst.

4. An exhaust gas purifying apparatus for an internal combustion engine according to claim 1, wherein a component forming said SOx absorbent and a component forming said NOx chemisorption reduction catalyst are supported on a common support.

5. An exhaust gas purifying apparatus for an internal combustion engine according to claim 1, wherein a coating layer of said SOx absorbent is provided on an upper layer of said NOx chemisorption reduction catalyst.

6. An exhaust gas purifying apparatus for an internal combustion engine according to claim 1, wherein said SOx absorbent comprises at least one kind of element selected from a group consisting of platinum, rhodium and palladium, and an oxide of at least one kind of element selected from a group consisting of oxides of aluminum, cobalt and zinc.

7. An exhaust gas purifying apparatus for an internal combustion engine according to claim 1, wherein said NOx chemisorption reduction catalyst includes a porous support of inorganic oxide, an oxide of a NOx chemisorption component, an oxide of a rare-earth metal and a noble metal, and said NOx chemisorption component comprises at least one kind of element selected from a group consisting of lithium, sodium, kalium, strontium, magnesium and calcium, and titanium.

8. An exhaust gas purifying apparatus for an internal combustion engine according to claim 7, wherein said NOx chemisorption component comprises a complex oxide of at least one kind of element selected from a group consisting of lithium, sodium, kalium, strontium, magnesium and calcium, and titanium.

9. An exhaust gas purifying apparatus for an internal combustion engine according to claim 1, wherein said SOx absorbent comprises a porous support of alumina, and at least one noble metal selected from a group consisting of platinum, palladium and rhodium, and a zinc oxide, supported on said porous support of alumina.

10. An exhaust gas purifying apparatus for an internal combustion engine according to claim 9, wherein said zinc is contained by 7–40 wt % on the metal basis per 100 wt % of said alumina.

11. An exhaust gas purifying apparatus for an internal combustion engine according to claim 9, wherein said noble metal is contained by 0.5–3 wt % per 100 wt % of said alumina.

12. An exhaust gas purifying apparatus for an internal combustion engine according to claim 1, wherein said SOx absorbent comprises a porous support of alumina, and at least one noble metal selected from a group consisting of platinum, palladium and rhodium, supported on said porous support of alumina.

13. An exhaust gas purifying apparatus for an internal combustion engine according to claim 12, wherein said noble metal is contained by 0.5–3 wt % per 100 wt % of said alumina.

14. An exhaust gas purifying apparatus for an internal combustion engine according to claim 1, wherein said SOx absorbent comprises a porous support of alumina, and at least one noble metal selected from a group consisting of platinum, palladium and rhodium, and a cobalt oxide, supported on said porous support of alumina.

15. An exhaust gas purifying apparatus for an internal combustion engine according to claim 4, wherein said common support is alumina, and components composing said NOx chemisorption reduction catalyst and zinc are supported on porous supports of said alumina.

16. An exhaust gas purifying apparatus for an internal combustion engine according to claim 5, wherein a coating layer made of SOx absorbent powders composed of zinc and platinum supported on porous supports of alumina is provided on an upper layer of said NOx chemisorption reduction catalyst.

17. An exhaust gas purifying apparatus for an internal combustion engine, having a SOx absorbent and a NOx reduction catalyst each arranged in an exhaust path of the internal combustion engine in which lean burn is effected, said SOx absorbent absorbing SOx in an inflow exhaust gas under an oxidizing atmosphere in which the $O_2$ concentration of said exhaust gas is higher than a stoichiometric ratio required for completely burning a reductive component contained in said exhaust gas, and releasing the absorbed SOx under a reducing atmosphere in which the $O_2$ concentration of an exhaust gas is lower than a stoichiometric ratio required for completely burning a reductive component contained in said exhaust gas, said NOx purification catalyst capturing NOx in said exhaust gas under the oxidizing atmosphere in which the $O_2$ concentration of said exhaust gas is higher than a stoichiometric ratio required for completely burning a reductive component contained in said exhaust gas, wherein as said NOx purifying catalyst, there is provided a NOx chemisorption reduction catalyst chemically capturing NOx as $NO_2$ on a surface of said NOx purifying catalyst under said oxidizing atmosphere and reducing the chemically captured $NO_2$ with said reductive component to $N_2$ to release the $N_2$ from the surface of said NOx purifying catalyst under said reducing atmosphere, an operational condition determining means for determining an operational condition of said internal combustion engine, and an air fuel ratio controlling means, and wherein said NOx chemisorption reduction catalyst includes a porous support of inorganic oxide, an oxide of a NOx chemisorption component, an oxide of a rare-earth metal and a noble metal, and said NOx chemisorption component comprises at least one kind of element selected from a group consisting of lithium, sodium, potassium, strontium, magnesium and calcium, and titanium.

18. An exhaust gas purifying method of purifying NOx contained in an exhaust gas, by arranging, in an exhaust path of an internal combustion engine, in which lean burn is effected, a SOx absorbent absorbing SOx in an inflow exhaust gas under an oxidizing atmosphere in which the $O_2$ concentration of said exhaust gas is higher than a stoichiometric ratio required for completely burning a reductive component contained in said exhaust gas, and releasing the absorbed SOx under a reducing atmosphere in which the $O_2$ concentration of an exhaust gas is lower than a stoichiometric ratio required for completely burning a reductive component contained in said exhaust gas, and a NOx purification catalyst capturing NOx in said exhaust gas under the oxidizing atmosphere in which the $O_2$ concentration of said exhaust gas is higher than a stoichiometric ratio required for completely burning a reductive component contained in said exhaust gas, wherein said NOx purification catalyst, is formed of a NOx chemisorption reduction catalyst chemically capturing NOx as $NO_2$ on a surface of said NOx purifying catalyst under said oxidizing atmosphere and reducing the chemically captured $NO_2$ with said reductive component to the $N_2$ from the surface of said NOx purifying catalyst under said reducing atmosphere, and the NOx chemically captured on a surface of said NOx chemisorption reduction catalyst when an exhaust gas flowed in said NOx chemisorption reduction catalyst is under said oxidizing atmosphere, is reduced and released as $N_2$ by controlling an air fuel ratio so that the exhaust gas flowed in said NOx chemisorption reduction catalyst becomes a reducing atmosphere, and wherein said NOx chemisorption reduction catalyst includes a porous suppport of inorganic oxide, an oxide of a NOx chemisorption component, an oxide of a rare-earth metal and a noble metal, and said NOx chemisorption component comprises at last one kind of element selected from a group consisting of lithium, sodium, potassium, strontium and calcium, and titanium.

19. An exhaust gas purifying method according to claim 18, wherein an operating condition determining means for determining an operating condition of said internal combustion engine and an air fuel ratio control means are provided, said operating condition determining means having an SOx absorbed amount estimating means and a SOx released amount estimating means;

an amount of SOx absorbed by the SOx absorbent under said oxidizing atmosphere is estimated by said SOx absorbed amount estimating means, an operating condition of an combustion chamber is switched so as to produce a reducing atmospheric exhaust gas by said air fuel ratio control means if said SOx absorbed amount estimating means judges that a cumulative value of said amount of absorbed SOx reaches a predetermined value;

an amount of SOx released from the SOx absorbent under said reducing atmosphere is estimated by said SOx released amount estimating means, an operating condition of the combustion chamber is switched so as to produce an oxidizing atmospheric exhaust gas by said air fuel ratio control means if said SOx released amount estimating means judges that a cumulative value of said amount of released SOx reaches a predetermined value.

20. An exhaust gas purifying method according to claim 18, wherein the NOx in the exhaust gas is cleaned while the NOx purifying catalyst is being prevented or suppressed to absorb SOx by providing an exhaust gas temperature measuring means for measuring an exhaust gas temperature flowing to said SOx absorbing material, a time measuring means for respectively measuring a time period in which the exhaust gas is an oxidizing atmosphere and a time period in which the exhaust gas is a reductive atmosphere, an exhaust gas velocity estimating means for estimating a velocity of the exhaust gas discharged from a combustion chamber, an operating condition determining means including an SOx absorbed amount estimating means and an SOx discharged amount estimating means, and an air-to-fuel ratio control means; and said method estimating an SOx absorbed amount under said oxidizing atmosphere by said SOx absorbed amount estimating means using a fuel injection rate obtained from said air-to-fuel ratio control means, an exhaust gas flow rate obtained from said exhaust gas amount determining means, an exhaust gas temperature obtained from said exhaust gas temperature measuring means and an operating time obtained from said time measuring means;

switching an operating condition of an combustion chamber so as to produce a reductive atmosphere exhaust gas by said air-to-fuel ratio control means if said SOx absorbed amount estimating means judges that a cumulative value of said amount of absorbed SOx reaches a predetermined value;

estimating a time period required for discharging SOx under said reductive atmosphere by said SOx discharged amount estimating means using an exhaust gas temperature and an exhaust gas flow rate and a predetermined SOx discharged amount from the SOx absorbing material;

measuring a time period in which the exhaust gas is a reductive atmosphere by said time measuring means; and switching an operating condition of the combustion chamber so as to produce an oxidizing atmosphere exhaust gas by said air-to-fuel ratio control means if said SOx discharged amount estimating means judges that said time period in which the exhaust gas is the reductive atmosphere exceeds said estimated time period.

21. A method of recovering a NOx chemisorption reduction catalyst, arranged in an exhaust path of an internal combustion engine and detracted from the NOx purifying ability by adsorption or absorption of SOx in an exhaust gas, wherein when a running distance or time reaches a predetermined condition, an operation is switched to a fuel rich combustion operation or stoichiometric combustion operation to release SOx from said NOx chemisorption reduction catalyst even if the operation is in a fuel lean combustion operation.

22. A method of recovering a NOx chemisorption reduction catalyst, arranged in an exhaust path of an internal combustion engine and detracted from the NOx purifying ability by adsorption or absorption of SOx in an exhaust gas, wherein said method comprises the steps of estimating an amount of sulfur oxides discharged to the exhaust gas from a sulfur concentration contained in a fuel and a consumed amount of the fuel;

estimating an amount of said sulfur oxides absorbed into said catalyst, a produced amount of sulfurous salts and a converted amount from the sulfurous salts to sulfuric salts from an exhaust gas temperature and/or a catalyst temperature; and allowing a rich gas or a stoichiometric gas to flow through said passage to reduce and decompose the sulfurous salts by forming a reductive atmosphere when an amount of the sulfurous salts or the sulfuric salts existing in the catalyst estimated from the cumulative values reaches a predetermined value.

23. A method of recovering a NOx chemisorption reduction catalyst, arranged in an exhaust path of an internal combustion engine and detracted from the NOx purifying ability by adsorption or absorption of SOx in an exhaust gas, wherein said method comprises the steps of estimating an amount of sulfur oxides discharged to the exhaust gas from a sulfur concentration contained in a fuel and a consumed amount of the fuel;

estimating an amount of said sulfur oxides absorbed into said catalyst, a produced amount of sulfurous salts and a converted amount from the sulfurous salts to sulfuric salts from an exhaust gas temperature and/or a catalyst temperature; and allowing a rich gas or a stoichiometric gas to flow through said passage to reduce and decompose the sulfurous salts by forming a reductive atmosphere when an amount of the sulfurous salts or the sulfuric salts existing in the catalyst estimated from the accumulated amounts under an oxygen rich atmosphere reaches a predetermined value.

24. A method of recovering a NOx chemisorption reduction catalyst, arranged in an exhaust path of an internal combustion engine and detracted from the NOx purifying ability by adsorption or absorption of SOx in an exhaust gas, wherein said method comprises the steps of detecting a concentration of nitrogen oxides in the exhaust gas at the timing when a predetermined time elapses after switching from operating under a reductive atmosphere condition to operation under an oxygen rich condition using a signal from a nitrogen oxide sensor arranged downstream of the exhaust gas purifying catalyst of the exhaust gas passage;

estimating a decreasing ratio of nitrogen oxide purifying rate from said concentration of nitrogen oxides by calculation; and allowing a rich gas or a stoichiometric gas to flow through said passage to reduce and decompose the sulfurous salts by forming a reductive atmosphere when an amount of the sulfurous salts and an amount of the sulfuric salts existing in the catalyst estimated from the decreasing ratio of nitrogen oxide purifying rate reaches a predetermined value.

* * * * *